US008036491B2

(12) United States Patent
Matsui et al.

(10) Patent No.: US 8,036,491 B2
(45) Date of Patent: Oct. 11, 2011

(54) APPARATUS AND METHOD FOR ALIGNING IMAGES BY DETECTING FEATURES

(75) Inventors: Shinichi Matsui, Hamura (JP); Akira Hamada, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 799 days.

(21) Appl. No.: 11/492,135

(22) Filed: Jul. 24, 2006

(65) Prior Publication Data

US 2007/0031004 A1 Feb. 8, 2007

(30) Foreign Application Priority Data

Aug. 2, 2005 (JP) ................... 2005-223702

(51) Int. Cl.
*G06K 9/32* (2006.01)
(52) U.S. Cl. .................. 382/294; 345/672; 345/677
(58) Field of Classification Search .............. 382/103, 382/190, 294; 345/672, 677
See application file for complete search history.

(56) References Cited

U.S. PATENT DOCUMENTS

| 6,067,369 | A  | * | 5/2000  | Kamei .............. 382/125 |
| 6,243,492 | B1 | * | 6/2001  | Kamei .............. 382/181 |
| 6,781,591 | B2 | * | 8/2004  | Raskar ............. 345/582 |
| 6,909,794 | B2 | * | 6/2005  | Caspi .............. 382/128 |
| 7,409,108 | B2 | * | 8/2008  | Xu et al. ........... 382/294 |
| 2002/0167537 | A1 |   | 11/2002 | Trajkovic |

FOREIGN PATENT DOCUMENTS

JP 2004-357040 A 12/2004
JP 2006-203717 A 8/2006

OTHER PUBLICATIONS

Calvin Maurer Registration of Head CT Images to Physical Space Using a Weighted Combination of Points and Surfaces IEEE Transactions on Medical Imaging, vol. 17 No. 5, Oct. 1998.*
Calvin R. Maurer et al, Registration of 3-D Images Using Weighted Geometrical Features, IEEE Dec. 1996.*
International Search and Written Opinion of the International Searching Authority for PCT/JP2006 / 314329, dated Jun. 15, 2007. 13 Sheets.
Yuh-Hwan Liu et al, "A New Approach for the Pelvic Registration and Fusion of CT and MR Images", Proceedings of the SPIE—The International Society for Optical Engineering, SPIE—The International Society for Optical Engineering USA, vol. 3034, 1997, pp. 1015-1016, XP008079431, ISSN-0227-786X (Abstract—p. 1006, lines 14-16.
Alkaabi, S. et al, "Iterative Transform Parameter Refinement for Image Registration", IEE International Conference on Visual Information Engineering (VIE 2005) (CP No. 509) IEE Stevenage, UK, 2005, pp. 65-72, XP008079396, ISBN: 0-86341-507-5.
Trajkovic, Miroslav et al, "Fast corner detection" Image and Vision Computing, Elsevier, Netherlands, vol. 16, No. 2, Feb. 20, 1998, pp. 75-87, XP002435562, ISSN: 0262-8856.
Japanese Office Action dated Jun. 7, 2010 and English translation thereof, issued in counterpart Japanese Application No. 2005-223702.

* cited by examiner

*Primary Examiner* — Wesley Tucker
*Assistant Examiner* — Mark Roz
(74) *Attorney, Agent, or Firm* — Holtz, Holtz, Goodman & Chick, PC

(57) ABSTRACT

An image processing apparatus includes a full feature point detection section for detecting as a full feature point a point whose pixel value changes significantly along any line through the point, and a semi feature point detection section for detecting as a semi feature point a point whose pixel value hardly changes along one line through the point but changes significantly along other lines through the point.

18 Claims, 19 Drawing Sheets

PRIOR ART

PRIOR ART

APPARATUS AND METHOD FOR ALIGNING IMAGES BY DETECTING FEATURES

CROSS-REFERENCE TO RELATED APPLICATION

This application is based upon and claims the benefit of priority from the prior Japanese Patent Application No. 2005-223702, filed Aug. 2, 2005, the entire contents of which is incorporated herein by reference.

BACKGROUND OF THE INVENTION

1. Field of the Invention

The present invention relates to an apparatus and method for aligning images by detecting features. More particularly, the present invention relates to an image processing apparatus applied in an imaging device such as a digital camera, etc. which electrically shoots an object using an image pickup device such as a CCD and CMOS, etc.

2. Description of the Related Art

When shooting a dark object such as a night view, etc. using an imaging device such as a digital camera etc., in addition to opening an aperture and delaying a shutter speed, it is effective to enhance photographing sensitivity, namely, to enhance signal amplification of an image pickup device such as a CCD and CMOS, etc. However, if the photographing sensitivity gets too high, a noise such as an internal noise of the image pickup device will increase and an image becomes visually undesirable.

Accordingly, Japanese Laid-Open (Kokai) Patent Application No. 2004-357040 discloses an art (hereinafter referred to as conventional prior art) for reducing the noise by synthesizing a plurality of images that are taken in series. This is based on the findings that when a plurality of images that are taken of a same object in series are synthesized by overlapping them, random noise components are averaged while the object section of the synthesized image increases in proportion to the number of images. This enables reducing noise and enhancing photographing sensitivity, thereby enabling improvement of shooting performance of a dark object.

Meanwhile, due to a generally slow shutter speed when taking an image of a dark object, camera shake may occur. In addition, in the case where images of a same object are taken in series, a subtle shift may occur in the camera composition at each shoot timing.

Accordingly, merely "synthesizing a plurality of images that are taken of a same object in series by overlapping them" is not sufficient and it is necessary to enhance overlapping accuracy, namely, to perform precise alignment of the subject images. Regarding this aspect, the conventional prior art specifies that it extracts a "feature point" from a plurality of images that are taken of a same object in series and performs alignment (i.e., coordinate transformation) such that the feature points from these images are overlapped with each other.

In the conventional prior art, a "feature point" is defined as a "point at which luminance is high." However, it refers more generally to a point for which a motion vector (i.e., an optical flow) can be determined because a pixel value changes significantly when the pixel is moved along any line.

However, the conventional prior art as described above has a problem which should be improved.

FIG. 18 is a diagram showing an example of an object for explaining inconvenience caused by the conventional prior art. This object example comprises a sky 1 as a background, a building 3 having a number of windows 2 on the left, a utility pole 4 on the right, and electric cables 5, 6 that are stretched from and across the pole 4 from the top to the right bottom of the diagram. A dotted frame 7 on the left side of the diagram shows a photograph composition which does not cause inconvenience in synthesizing images (hereinafter referred to as a first composition 7) and a dotted frame 8 in the upper side of the diagram shows a photograph composition which causes in-convenience (hereinafter referred to as a second composition 8).

FIG. 19A is a diagram showing feature points in the first composition 7, and FIG. 19B is a diagram showing feature points in the second composition 8. The conventional prior art as described above extracts points with a high luminance in the image as the feature point. Accordingly, points with high luminance, that is, a corner of the outer wall of the building 3, a corner of the window 2 and the like are extracted as feature points both in the first composition 7 and the second composition 8 (See black circles in the diagram).

The difference between the first composition 7 and the second composition 8 lies in unevenness in distribution of the feature points. In other words, they differ in that while the feature points are uniformly distributed in the image in the first composition 7, the feature points are distributed unevenly in a part of the image (i.e., at the left bottom corner in this diagram) in the second composition 8.

In this example, when a plurality of images that are taken of a same object in series are synthesized, alignment has to be performed only at one section of the image (such as a center of the image, etc.) in principle. In a practical point of view, however, because there are a multitude of factors that may contribute to a minute error in alignment such as image distortion caused by peripheral aberration of the photographing lens, the limit of the image resolution, fluctuation of the light source, deformation of the object itself and the like (hereinafter referred to as an alignment error factors), alignment is essential at various points in the image.

In light of the foregoing points, when attention is paid to the first composition 73 and the second composition 8 as described above, since the feature points exist evenly in the image in the first composition 7, alignment can be performed without any inconvenience when a plurality of images are synthesized. On the other hand, since the feature points exist only in a part of the image in the second composition 8, precise alignment is possible only in the corresponding position (i.e., the portion where the feature points exist) when a plurality of images are synthesized. Accordingly, for the remaining portion (i.e., the portion where the sky 1 and the wire cables 5, 6 appear), there is no choice but to perform alignment indirectly referring to the information on remote feature points. Accordingly, this is problematic in that the alignment error factors as described above may lead to misalignment in the remaining portion (i.e., the portion where the sky 1 and the wire cables 5, 6 appear).

Therefore, the first object of the present invention is to provide an image processing apparatus capable of extracting feature points evenly from all portions of the image.

The second object of the present invention is to provide an image processing apparatus capable of accurately tracking an object in all portions of the image.

The third object of the present invention is to provide an image processing apparatus capable of precise alignment at all portions of the image when images are synthesized.

SUMMARY OF THE INVENTION

In order to accomplish the foregoing objects, in accordance with an aspect of the present invention, an image processing apparatus includes: a full feature point detection section for detecting, as a full feature point, a point whose pixel value changes significantly along any line through the point; a semi feature point detection section for detecting, as a semi feature point, a point whose pixel value hardly changes along one line through the point but changes significantly along other lines through the point; a first tracking section for tracking the full feature point between a first image and a second image; a second tracking section for tracking the semi feature point; and an alignment section for aligning the first and second images based on a tracking result of the first tracking section and the second tracking section.

In accordance with another aspect of the present invention, wherein the tracking direction of the second tracking section is only a direction in which a pixel value changes significantly.

In accordance with another aspect of the present invention, wherein the alignment section further comprises: an evaluation section for evaluating correctness of the calculated coordinate transform equation based on the tracking result made by the first tracking section and the second tracking section, and the alignment section picks and chooses the coordinate transform equation furthermore based on a judgment made by the evaluation section.

In accordance with another aspect of the present invention, wherein the evaluation section weights more on an evaluation related to full feature point than on an evaluation related to the semi feature point.

In accordance with still another aspect of the present invention, there is provided an image processing apparatus, further comprising: an addition section for synthesizing one image from a plurality of images which have been subjected to alignment by the alignment section.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereinafter, the preferred embodiments of the present invention will be described in detail with reference to the drawings. It is apparent that various detailed specifications or examples as well as illustration of numerical figures, texts and other symbols in the following description are merely references for clarifying the concept of the present invention, and that the concept of the present invention is not limited by all or a part of these. In addition, detailed explanations regarding known methods, known procedures, known architecture, known circuit structures or the like (hereinafter referred to as a 'known matter') shall be omitted, which is also to be intended to clarify explanation and not to exclude all or a part of these known matters intentionally. Since such known matters had been known to those skilled in the art at the time of application of the present invention, they are as a matter of course included in the following description.

Figure 1:
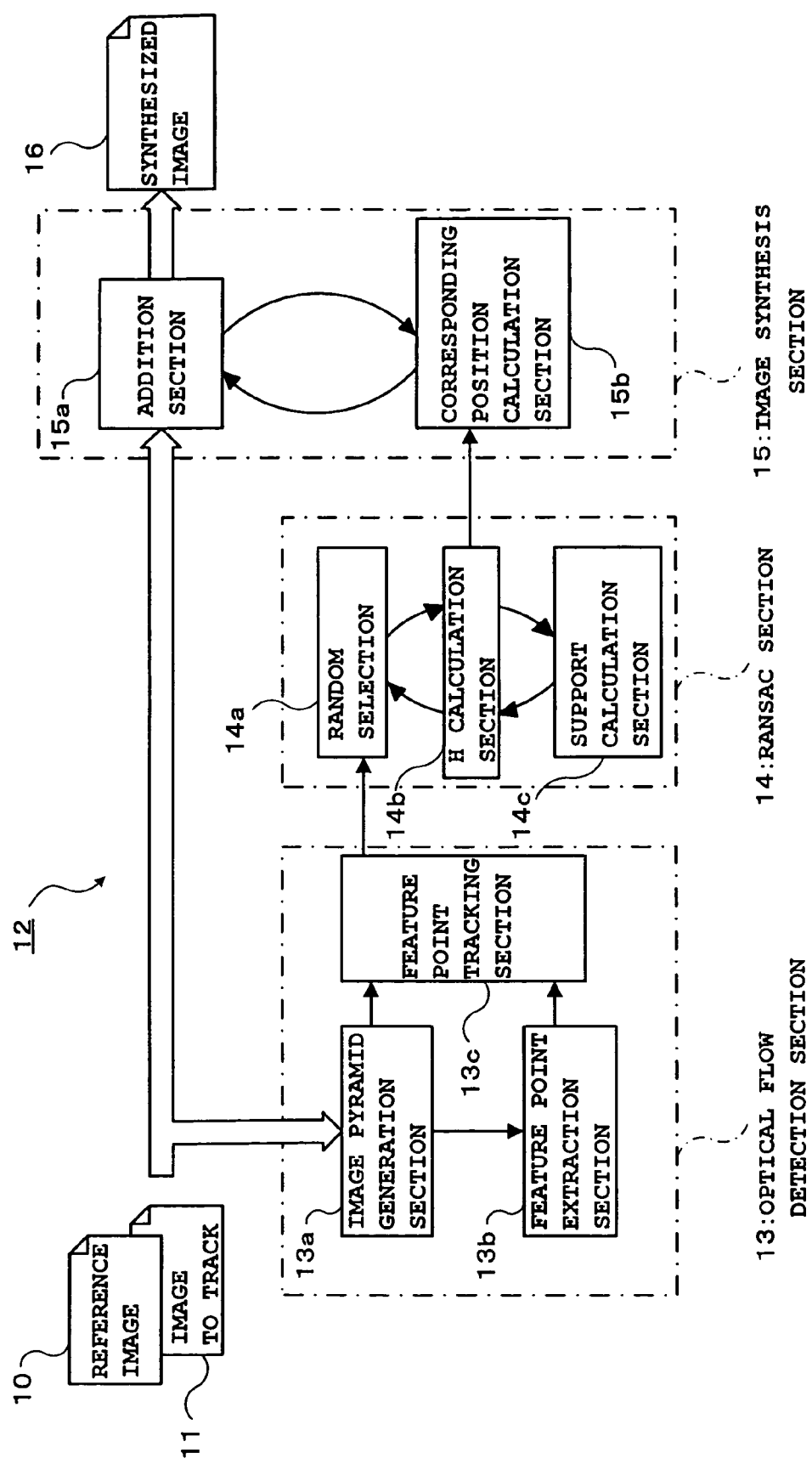
FIG. 1 is a schematic structural diagram of an image processing apparatus in an embodiment of the present invention.

FIG. 1 is a schematic structural diagram of an image processing apparatus of the present embodiment. In this diagram, a reference image 10 and an image to be tracked 11 are a plurality of images that are taken of a same object in series. Although the two images (the reference image 10 and the image to be tracked 11) are used in the present embodiment, this number of images refers to the minimum required number of images for image synthesis. In addition, "a plurality of images that are taken of a same object in series" refers to one of: images that are taken at individual normal shutter operations that are performed several times; continuously shot images, that is, a plurality of images that are taken in series by a single shutter operation; or an each frame taken by movie shooting.

The image processing apparatus 12 comprises an optical flow detection section 13, a RANSAC section 14 and an image synthesis section 15. In addition, the optical flow detection section 13 comprises an image pyramid generation section 13a, a feature point extraction section 13b and a feature point tracking section 13c. The RANSAC section 14 comprises a random selection section 14a, an H calculation section 14b and a support calculation section 14c. The image synthesis section 15 comprises an addition section 15a and a corresponding position calculation section 15b.

The image pyramid generation section 13a of the optical flow detection section 13 takes in the reference image 10 and the image to be tracked 11, and reduces the resolution of these images step by step so as to generate stratified images (i.e., an image pyramid) starting from a low-resolution image to a high-resolution image. The feature point extraction section 13b of the optical flow detection section 13 extracts a conventional "feature point," that is, a point whose pixel value changes significantly along any line through the point. In the present specification, this point is referred to as a "full feature point" or "full feature." In addition, the feature point extraction section 13b extracts a point whose pixel value hardly changes along one line through the point but changes significantly along other lines through the point. In the present specification, this point is referred to as a "semi feature point" or "semi feature."

Examples of the full feature points include a small article accommodated in a clipping window, a corner of a big article, a particular pattern which changes in whatever direction it is moved and the like. On the other hand, examples of the semi feature includes an edge of a big article excluding its corner, a narrow linear-shaped matter, a pattern that changes only in one direction and the like, and the semi feature is typically a point on a straight line. In the case where a feature point is locally captured by the window, a point on an arc of a circle of a large radius, a point on a curve of a small curvature and the like are also included in the semi feature points.

With regard to the semi feature, a direction in which a pixel value changes significantly shall be referred to as a "feature direction." The feature direction shall be identical with an "eigenvector direction of the maximum eigenvalue" to be described later. In addition, also with regard to the semi feature, a direction in which a pixel value changes slightly shall be referred to as a "featureless direction." The featureless direction shall be identical with an "eigenvector direction of the minimum eigenvalue" to be described later.

The feature point tracking section 13c of the optical flow detection section 13 performs tracking processing of the full feature points and the semi full feature points that are extracted by the feature point extraction section 13b, and outputs the tracking results to the RANSAC section 14.

The random selection section 14a of the RANSAC section 14 randomly selects sets of tracked feature points (that is, a set of the full feature points and a set of the semi feature points). The H calculation section 14b calculates a candidate coordinate transform equation corresponding to the selected sets of the feature points. In addition, the support calculation section 14c evaluates to what extent the feature points (i.e., all full feature points and semi feature points) which have been transformed in accordance with the equation match the tracking result. The evaluation is made, for example, based on a number of supports, that is, a number of feature points (i.e., the inliers) for which a difference is within a certain distance. The RANSCAC section 14 repeats these operations, and outputs a coordination transformation equation which was used to determine the best evaluated value as a final result to the image synthesis section 15.

In accordance with the coordinate transformation equation output by the RANSAC section 14, the corresponding position calculation section 15b of the image synthesis section 15 performs a corresponding position calculation which is necessary for alignment of the reference image 10 and the image to be tracked 11. Based on the result of the corresponding position calculation, the addition section 15a generates an image (synthesized image 16) by adding or averaging the reference image 10 and the image to be tracked 11 which has been transformed corresponding to the reference image 10 for each pixel, and outputs the synthesized image 16.

Extraction (detection) of the feature points will now be described.

Figure 2:
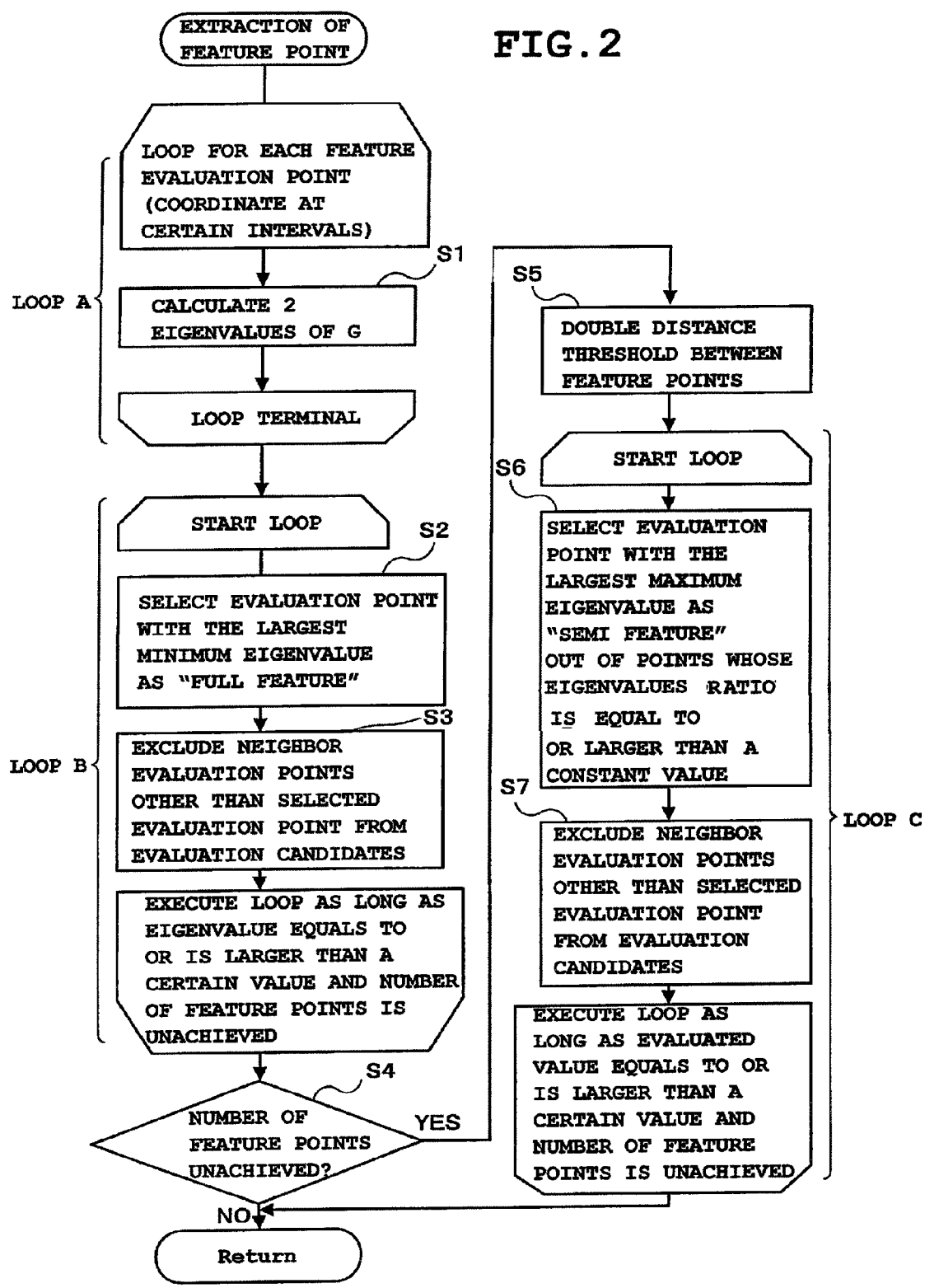
FIG. 2 is an operational flowchart of a feature point extraction section 13b.

FIG. 2 is a drawing showing an operational flowchart of the feature point extraction section 13b. This flow comprises three loops that are sequentially executed. The first loop (hereinafter referred to as a loop A) is a loop which is repeatedly executed for every feature evaluation point (i.e., for every coordinate at certain interval). Whenever the loop A is executed, two eigenvalues of gradient covariance matrix G (hereinafter merely referred to as matrix G) are calculated (Step S1).

The two eigenvalues of the matrix G are now explained. A window centering around a candidate feature point (i.e., evaluation point) is created, and if it is assumed that the condition that each point in the window has the same motion (or flow) (i.e., the local constraint) is satisfied, the following two formulas hold for a point $p_{ij}$ in the window:

$$f(p_{ij}) + (f_x(p_{ij}) f_y(p_{ij})) \begin{pmatrix} d_x \\ d_y \end{pmatrix} = f(p_{i+d_x, j+d_y}) \qquad \text{Formula 25}$$

and $$\left( f_x \equiv \frac{\partial f}{\partial x}, f_y \equiv \frac{\partial f}{\partial y} \right) \qquad \text{Formula 26}$$

Then, when Formula 25 is transposed, the following equation is found:

$$f_x(p_{ij}) f_y(p_{ij}) \begin{pmatrix} d_x \\ d_y \end{pmatrix} = f(p_{i+d_x, j+d_y}) - f(p_{ij}) \qquad \text{Formula 27}$$

where $f(p_{ij})$ refers to the reference image 10 and $f(p_{i+dx, j+dy})$ refers to the image to be tracked 11. This scalar equation is considered to approximately hold for all points $p_{ij}$ regarding the same flow $(d_x, d_y)^T$. When the window size is assumed to be the N×N pixels, while unknowns are two dimensional as shown in $(d_x, d_y)^T$, the number of equations is $N^2$, (which is overconstrained). Accordingly, a least squares solution is found. Generally speaking, x for minimizing an error (i.e., residual error) $\|Ax-b\|$ is a solution of the normal equation $A^T A x = A^T b$. Herein, $A^T A$ is a product of an N×2 matrix and a 2×N matrix. In this case when the following equation is placed:

$$g(p) = (f_x(p) f_y(p))^T \qquad \text{Formula 28}$$

and $A^T A$ can be transformed directly into the form of the sum of 2×2 matrices as follows:

$$G = (g(p_{00}) g(p_{01}) \cdots g(p_{n-1,n-1})) \begin{pmatrix} g(p_{00})^T \\ g(p_{01})^T \\ \vdots \\ g(p_{n-1,n-1})^T \end{pmatrix} = \sum_{p \in w} g(p) g(p)^T \qquad \text{Formula 29}$$

If the pixel residual value of p is performed to e(p), the right member of the equation can be described as follows:

$$e \equiv \sum_{p \in w} g(p) e(p) \qquad \text{Formula 30}$$

and the following equation is found:

$$Gd = e \qquad \text{Formula 31}$$

where e refers to a magnitude of the difference of the pixel values between the two images (the reference image 10 and the image to be tracked 11) at the same evaluation point, and an unknown vector d refers to a motion (i.e., tracking vector) at the same evaluation point.

The following holds true as a nature of the eigenvalues of the matrix G. First, both of the two eigenvalues have nonnegative values. In addition, if any one of the eigenvalues of the matrix G is obviously close to 0, perturbation of the eigenvector with respect to the eigenvalue which is close to 0 becomes larger. Accordingly, Formula 31 cannot be solved stably. In fact, this state (i.e., the state where one of the eigenvalues of the matrix G is obviously close to 0) is generated when the pixel values in the window are constantly substantially equal in a particular direction. This problem is also referred to as an aperture problem, and means that the larger the minimum eigenvalue is, the more stably Formula 31 can be solved when errors are considered. In addition, the eigenvalue of the matrix G is a sum square of the length determined by projecting the gradient of each point in the window in the eigenvector direction. The eigenvector corresponding to the larger eigenvalue (i.e., the maximum eigenvalue) has a direction for maximizing the sum. On the other hand, the eigenvector corresponding to the smaller eigenvalue (i.e., the minimum eigenvalue) has a direction perpendicular to this direction (i.e., a direction for minimizing the sum).

Also to the "semi feature" that is newly proposed in the present invention, an algorithm similar to that used for the full feature is applied. However, the algorithm is different in that d in full feature equation Formula 31 is solved by adding a predetermined constraint shown in Formula 32 as follows:

$$d = \left(\frac{1}{\lambda}u^T e\right)u \qquad \text{Formula 32}$$

Figure 3:
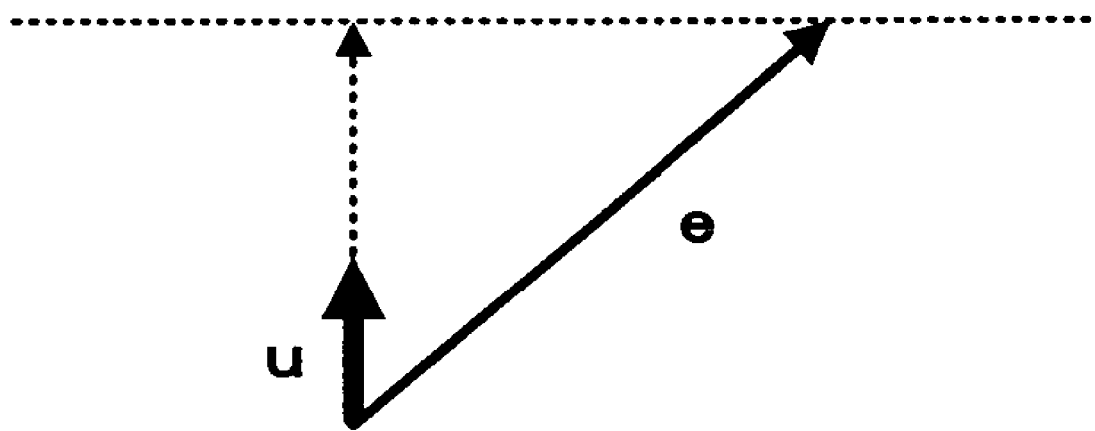
FIG. 3 is an explanatory view of a predetermined constraint.

FIG. 3 is an explanatory view of the predetermined constraint. In this diagram and Formula 32, d refers to a tracking vector, $1/\lambda$ an amount of adjustment on gradient, and u a unit eigenvector. $u^T e$ refers to an inner product of the unit eigenvector u and the residual vector e, that, the component (the scalar amount) of the residual vector e with respect to the direction of the unit eigenvector u. By using this Formula 32, a representative solution is found when the previous equation Formula 31 (which provides an indeterminate solution since the matrix G is linear dependent) is constrained to the direction of the unit eigenvector u of the maximum eigenvalue $\lambda$.

The constraint herein is not limited to the constraint described above, and for example, the components of the featureless direction of the motion vector may be ignored (or made unknown, indeterminate or free) in the tracking result of the semi feature points so as to make only components in the feature direction effective. Alternatively, when the semi feature points are tracked, the motion in the featureless direction may be set as a constant (e.g., 0) and they may be searched by a block matching method or the like, with constraint being imposed only to the feature direction.

In addition to this, with regard to the semi feature points, a magnitude of the gradient (or a magnitude of the rate of change) in the direction where a pixel value changes most when the pixel is moved in a certain direction may be used as an evaluated value to be used for ranking the semi feature points. In other words, an evaluation point at which a clear difference appears in at least one direction may be selected as the semi feature point.

In addition, when the semi feature points are selected, a pixel for which a ratio found by dividing the magnitude of the gradient (or the magnitude of the rate of change) in the direction where a pixel value changes most when the pixel is moved in a certain direction, by the magnitude of the gradient (or the magnitude of the rate of change) in the direction where a pixel value changes least is small may be excluded from candidate semi features. Alternatively, the evaluated value may be reduced for the pixel.

In addition, as a specific method to evaluate the magnitude of the gradient when the semi feature points are to be detected, the eigenvalue of the matrix G of the previous equation Formula 29 may be used. In other words, the magnitude of the gradient in the direction where a pixel value changes most when the pixel is moved in a certain direction may be set as the maximum eigenvalue, and the magnitude of the gradient in the direction where a pixel value changes least when the pixel is moved in a certain direction may be set as the minimum eigenvalue.

In addition, (an approximate value of) the maximum curvature may be used as a method to evaluate the magnitude of the gradient for the semi feature points.

Principal curvatures $k_1$ and $k_2$ of the pixel value (luminance) with respect to a coordinate (x, y) can be derived either by examining each direction using a second-order difference of the averaged neighbor pixel values directly or using a coefficient obtained by applying neighbor pixels to polynomial approximation; or by using the relationship between the averaged curvature $h=(k_1+k_2)/2$ where Gaussian curvature is $K=k_1, k_2$, and the first-order derivative values $P_x$, $P_y$, and the second-order derivative values $P_{xx}$, $P_{yy}$, $P_{xy}$ of the pixel values (luminance). (See the following equations Formulas 33 and 34.) As a method to calculate the derivative values in the equations mentioned above, a method to find a difference from the neighbor pixels after smoothing, or a method to find the derivative values using a coefficient determined by applying the neighbor pixel values to polynomial approximation can be used.

$$h = \frac{P_{xx} + P_{yy} + P_{xx}P_y^2 + P_{yy}P_x^2 - 2P_{xy}P_xP_y}{2(1 + P_x^2 + P_y^2)} \qquad \text{Formula 33}$$

$$K = \frac{P_{xx}P_{yy} - P_{xy}^2}{1 + P_x^2 + P_y^2} \qquad \text{Formula 34}$$

In addition, when the semi feature points are to be selected, the minimum distance to another feature point (i.e., a full feature point or a semi feature point) may be larger than the minimum distance between the full feature points. In many cases, two semi feature points that exist with a relatively small distance therebetween belong to an edge in the same direction of the same substance. Accordingly, the eigenvector is highly linear dependent, which is redundant as the constraint on the motion of the whole image. This is because, in such a case, not only that increase of the semi feature points gives a small effect, but also that application of RANSAC, the least squares method or the like may cause problems.

Figure 4:
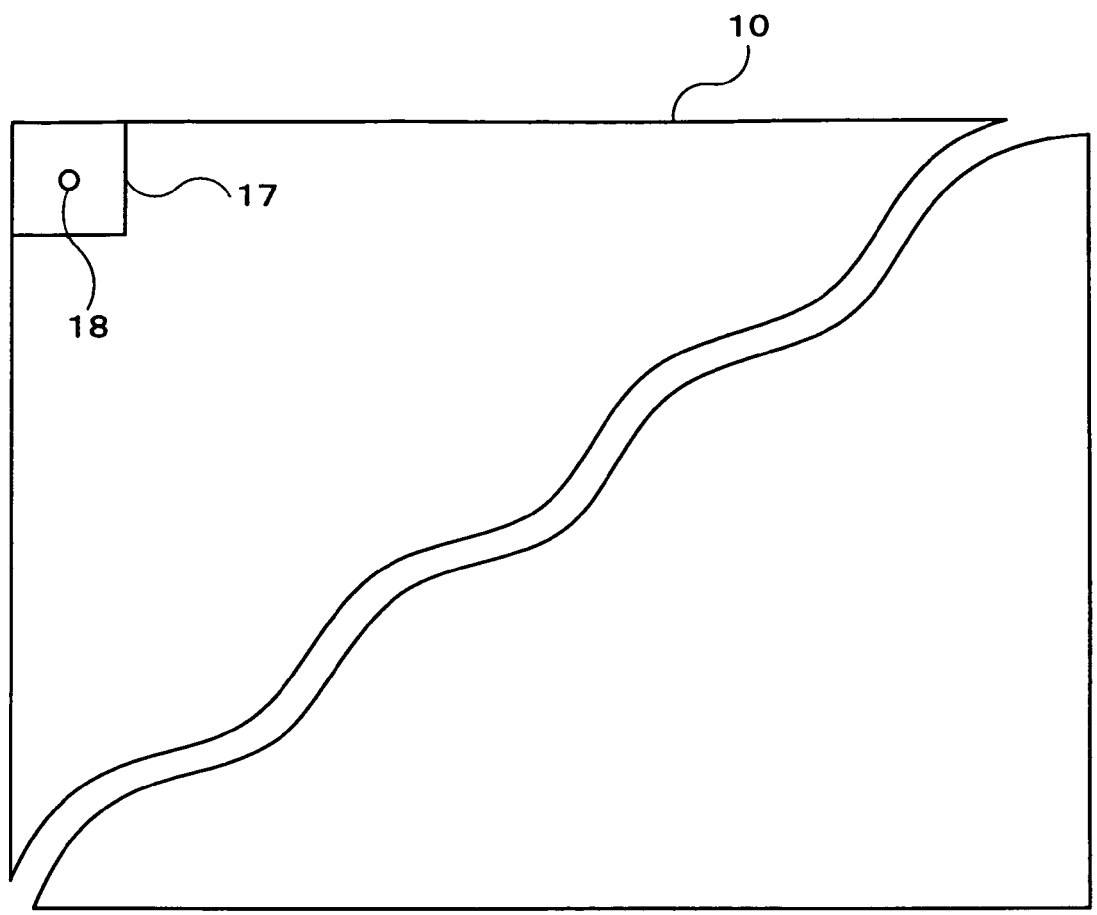
FIG. 4 is a conceptual view (1/2) of a loop A.
Figure 5:
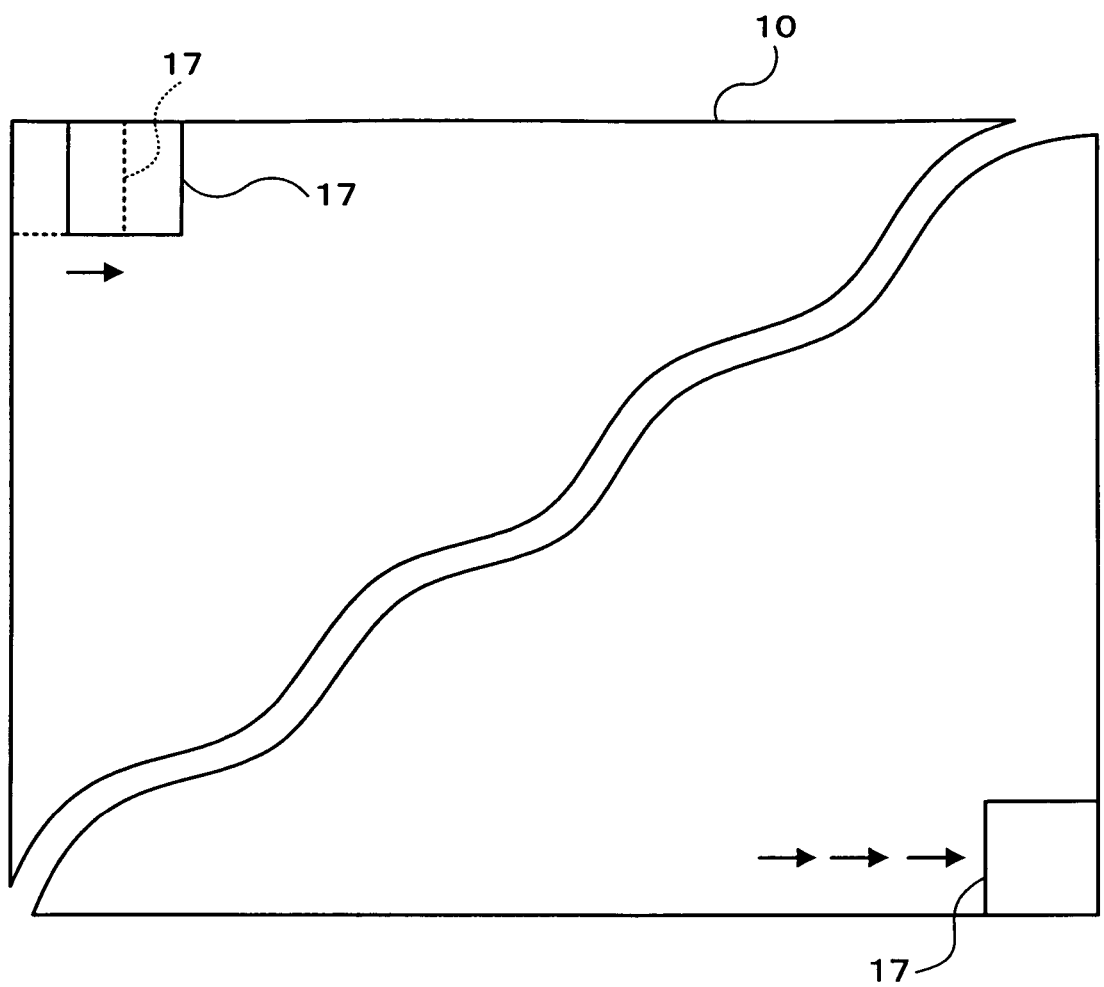
FIG. 5 is a conceptual view (2/2) of the loop A.

FIG. 4 and FIG. 5 are conceptual views of a loop A. First, as shown in FIG. 4, a window 17 of a certain size (such as approximately 7×7 pixels to 31×31 pixels) is applied so as to set an evaluation point 18 for the initial position on the reference image 10. Next, every time the loop A is repeated, the window 17 is shifted by a predetermined amount (such as ½ window of the width). Finally, the window 17 reaches to the final pixel of the reference image 10, the loop A is terminated.

Referring back to FIG. 2, a second loop (hereinafter referred to as a loop B) is a loop which is executed after the loop A. Every time the loop B is executed, the evaluation point whose minimum eigenvalue is the largest is selected as a "full feature point" (Step S2), and neighbor evaluation points other than the selected evaluation point are excluded from the evaluation candidates (Step S3). As long as the eigenvalue equals to or is larger than a certain value and the number of feature points is unachieved (that is, the number of feature points is less than a predetermined number), the loop B is continued.

Figure 6:
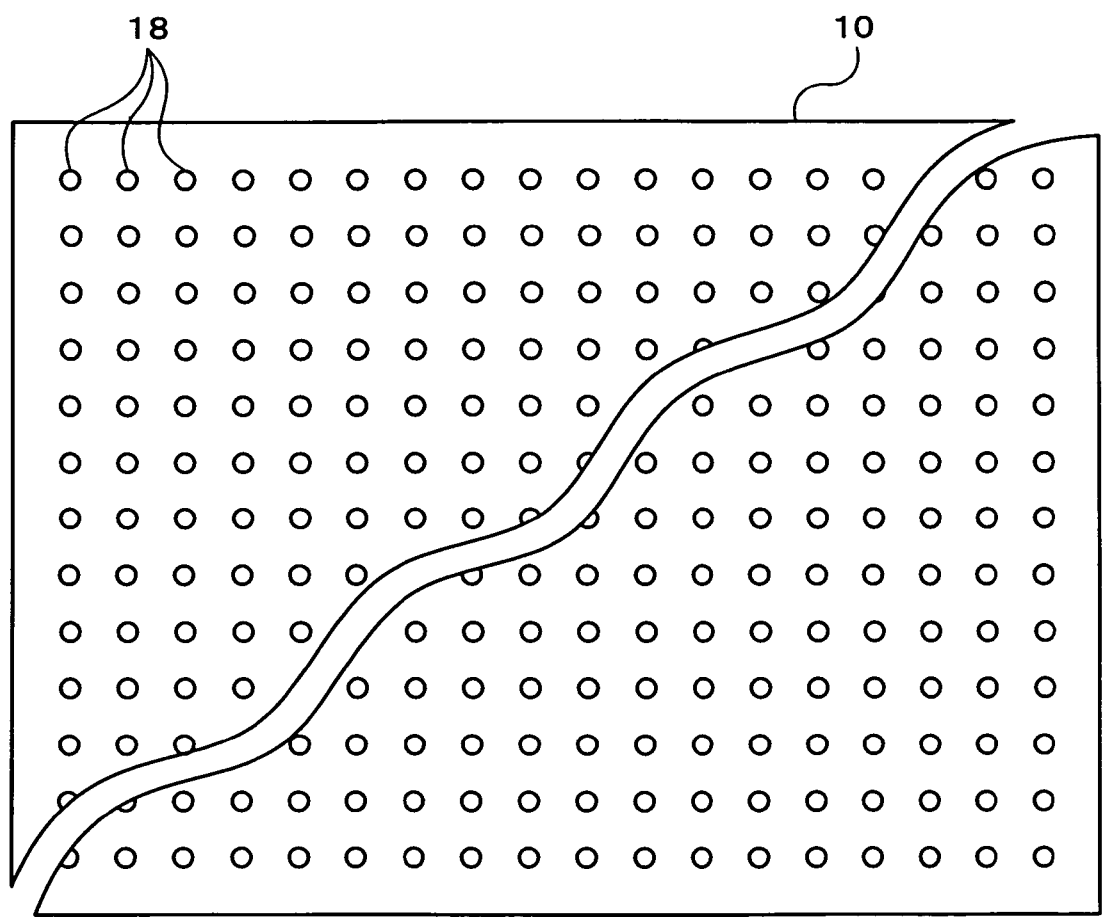
FIG. 6 is a conceptual view (1/4) of a loop B.
Figure 7:
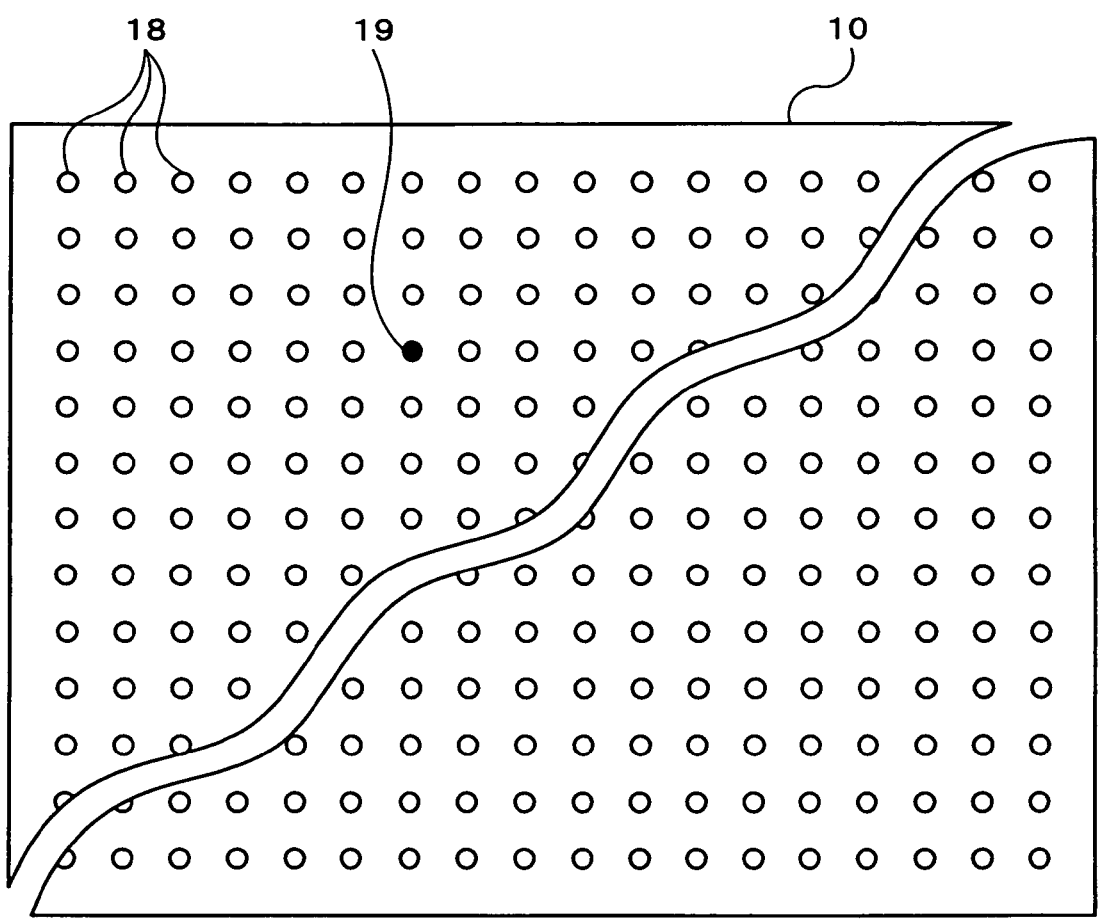
FIG. 7 is a conceptual view (2/4) of the loop B.
Figure 8:
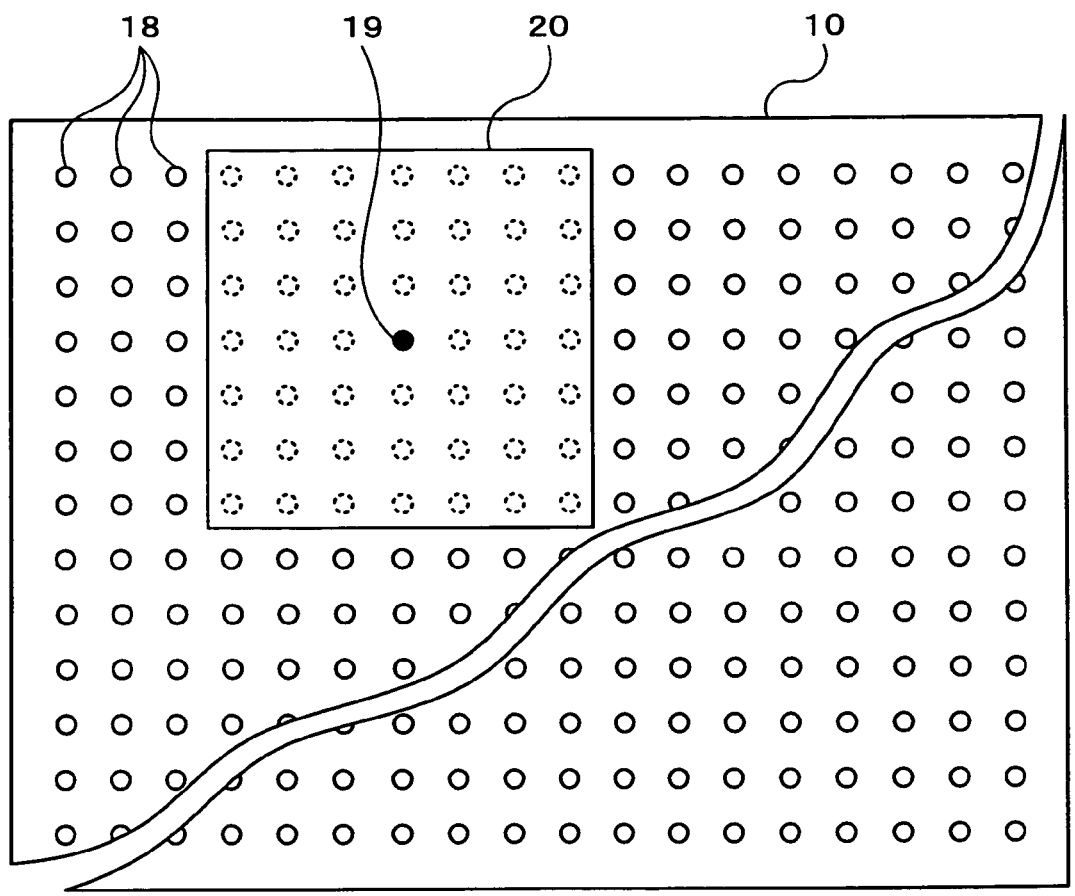
FIG. 8 is a conceptual view (3/4) of the loop B.
Figure 9:
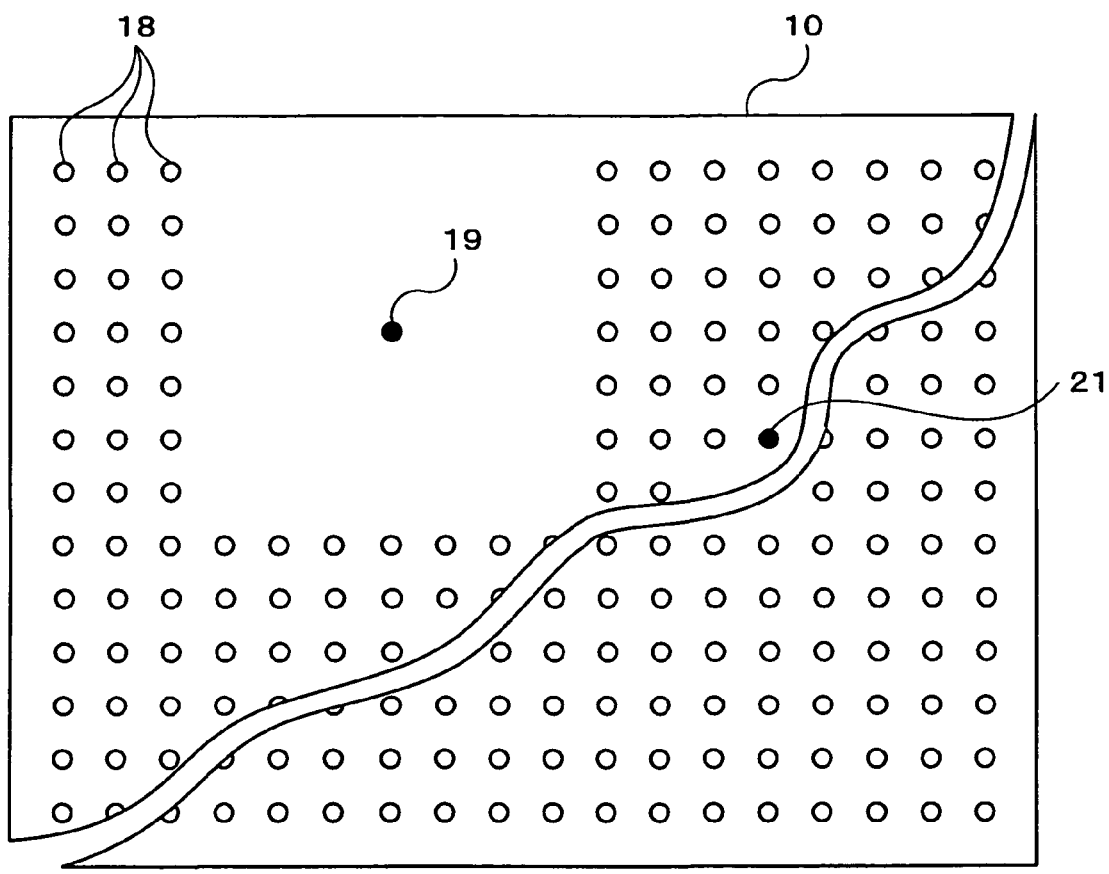
FIG. 9 is a conceptual view (4/4) of the loop B.

FIG. 6 and FIG. 9 are conceptual views of the loop B. First, as shown in FIG. 6, the eigenvalue data at individual evaluation points on the reference image 10 are sequentially compared with each other, and as shown in FIG. 7, the evaluation point whose minimum eigenvalue is the largest is selected as the "full feature point". In the present embodiment, the evaluation point on the 3rd line from the top and the 7th line from the left is selected as the full feature point 19 for convenience. Next, as shown in FIG. 8, evaluation points (as shown by dotted circles) that exist within a certain range 20 (within approximately several times of the distance between the evaluation points for the feature) around the selected full feature point 19 are excluded. Next, as shown in FIG. 9, the evaluation point whose minimum eigenvalue is the largest is selected out of the rest of the evaluation points as the "full feature point." In the present embodiment, the evaluation point on the 6th line from the top and the 5th line from the right is selected as the full feature point 21. Hereafter, this operation is repeated so as to select all full feature points.

Referring back to FIG. 2, after the process exits from the loop B, it is determined whether or not the number of feature points is unachieved (that is, the number of feature points is less than a predetermined number) (Step S4). In the case where the number of feature points is not unachieved, the flow is terminated as it is. In the case where the number of feature points is unachieved, a distance threshold between the feature points (i.e., an area of the certain range 20 in FIG. 8) is doubled (Step S5) and then a third loop (hereinafter referred to as a loop C) is executed. In the loop C, processing is repeated of selecting the evaluation point whose maximum eigenvalue is the largest out of the evaluation points whose eigenvalues ratio is equal to or larger than a predetermined value as a "semi feature point" every time the loop is executed (Step S6), and excluding neighbor evaluation points other than the selected evaluation point as evaluation candidates (Step S7). The loop is continued as long as the evaluated value equals to or is larger than a certain value and the number of feature points is unachieved, and then the flow is terminated.

As described above, in addition to detecting a conventional feature point, that is, the "full feature point," whose pixel value changes significantly along any line through the point, the feature point extraction section 13b in accordance with the present embodiment detects the "semi feature point," whose pixel value hardly changes along one line through the point but changes significantly along other lines through the point, when there are insufficient full feature points.

Tracking of the feature points (that is, tracking) will now be described.

Figure 10:
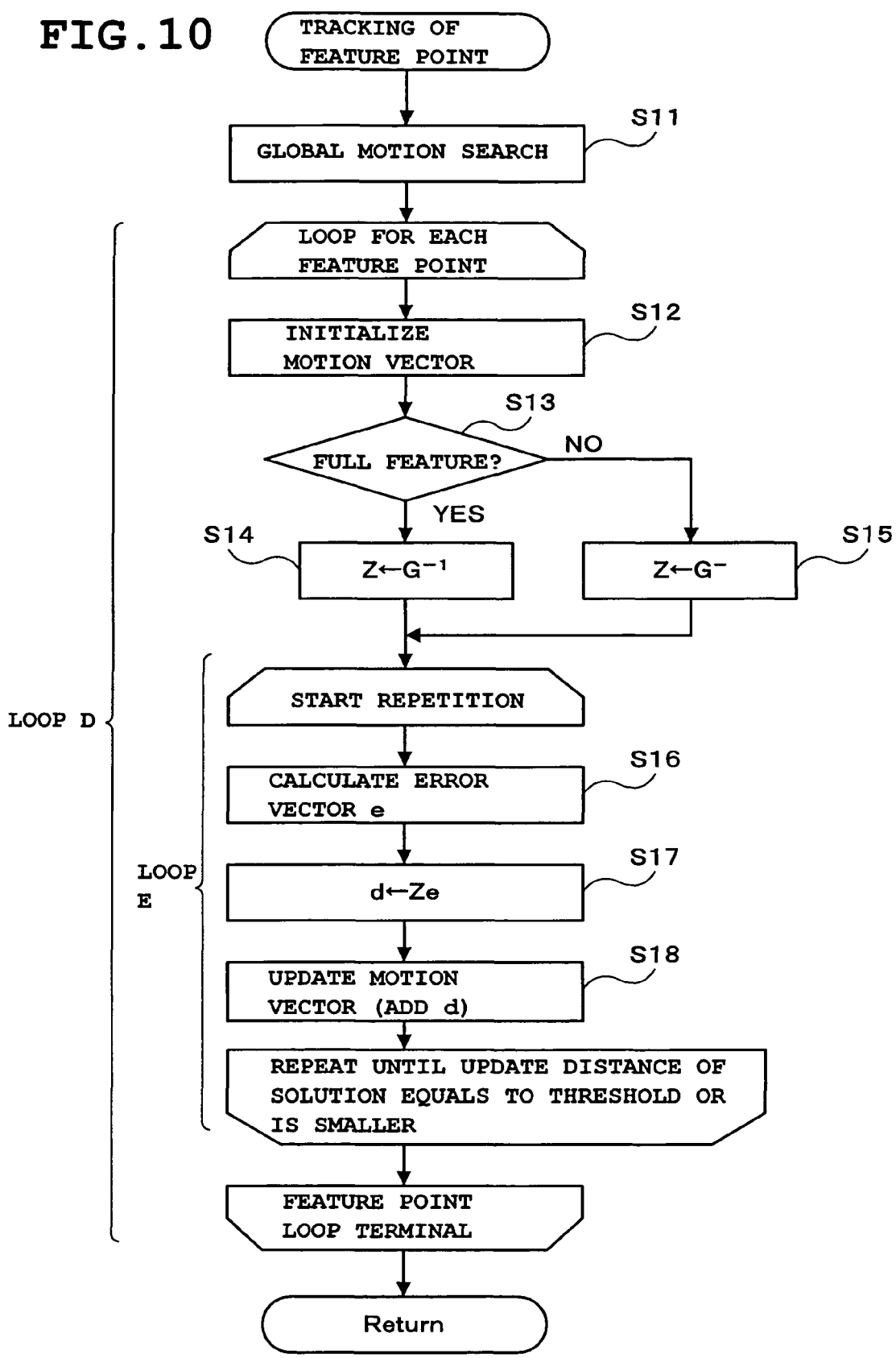
FIG. 10 is an operational flow chart of a feature point tracking section 13c.

FIG. 10 is an operational flowchart of the feature point tracking section 13c. This flow includes a first loop (hereinafter referred to as a loop D) and a second loop which nests inside the loop D (hereinafter referred to as a loop E).

Once the flow is started, at first, the global motion search is executed (Step S11) and then the loop D is initiated. In the global motion search, the reduced-sized images (for example, ¼ images) of both the reference image 10 and the image to be tracked 11 are created. Next, a position at which the window residual error is the smallest with respect to the window provided in the center portion of the reference image 10 is searched in the image to be tracked 11 using block matching so as to determine the global motion vector. The global motion vector is set as an initial vector hereafter. Accordingly, even if the motion is large, and the search direction is constrained and thus deviated from the real direction in tracking the semi feature, the two edges are matched. Repetition is performed by multiplying the two-dimensional square matrix Z and the residual vector (that is, the two-dimensional vector determined by multiplying the aforementioned window residual and window gradient value).

The two dimensional square matrix Z is an inverse matrix ($G^{-1}$) of the matrix G for the full feature as is the case with conventional one, and is the minimum norm inverse matrix ($G^-$) for the semi future. Specifically, equation shall be as follows using the maximum eigenvalue $\lambda$ and the eigenvector $u=(u_x\ u_y)^T$ corresponding thereto:

$$Z = \frac{1}{\lambda}\begin{pmatrix} u_x^2 & u_x u_y \\ u_x u_y & u_y^2 \end{pmatrix} \qquad \text{Formula 35}$$

This Formula 35 is equivalent to the previous equation Formula 32.

The loop D is executed for every feature point of the reference image 10. In the loop D, a motion vector is initialized by the aforementioned global motion vector (Step S12), and it is determined whether or not the feature of the motion vector is "full feature" (Step S13). In the case of the full feature, "$G^{-1}$" is set to the two-dimensional square matrix Z (Step S14) and in the case of the not full feature, that is, in the case of the semi feature, "$G^-$" is set to the two-dimensional square matrix Z (Step S15).

Next, the loop E is executed. In the loop E, an error vector E is calculated (Step S16), Ze is set to the tracking vector d (Step S17), and the motion vector is updated (i.e, added by d) (Step S18). After these, the loop E is repeated until the updated distance of the solution equals to or is smaller than a threshold (that is, a predetermined minute value indicating the error tolerance). When the updated distance of the solution equals to or is smaller than the threshold value, the process exits from the loop E, and the foregoing processing is repeated until the feature point loop terminal is reached.

As described above, according to the extraction (detection) and tracking of the present embodiment, semi feature points are also extracted and tracked in addition to the full feature points. Therefore, for example, even in the case where a non-presence area (non-detection area) of the full feature points exists in a part of the image, the non-presence area can be supplemented by the semi feature points. More specifically, according to the present embodiment, a point whose pixel value hardly changes along one line through the point but changes significantly along other lines through the point can be detected as the "semi feature point" out of the evaluation points which have been discarded in the conventional prior art and which are not detected as the full feature point. By utilizing the semi feature points, it is possible to cover the feature points (i.e., the full feature points and the semi feature points) for the whole image. As a result, even in the feature point non-presence portion for which precise alignment was difficult with the conventional prior art, the image misalignment can be accurately corrected by utilizing the semi feature points on the object.

Figure 11A:
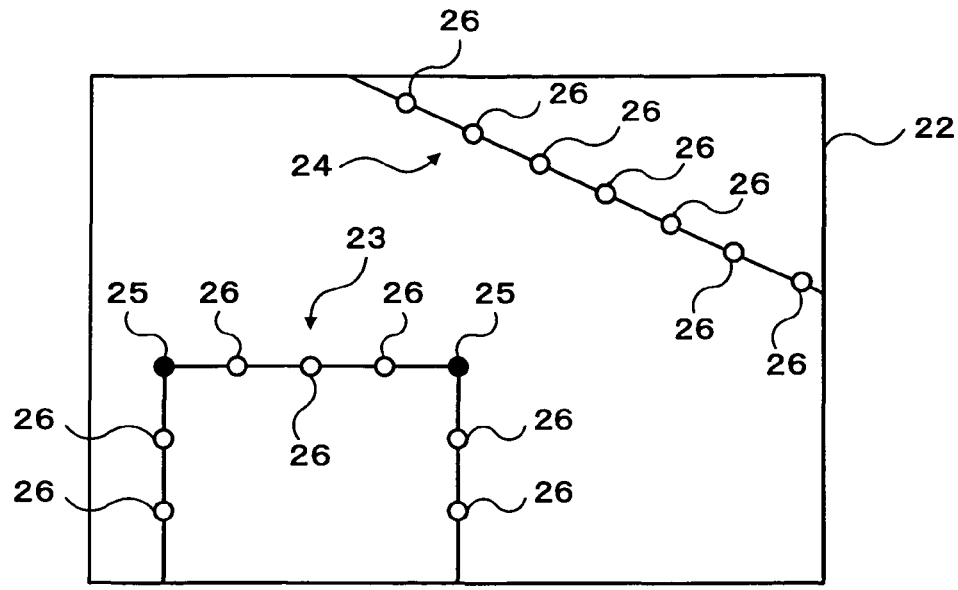
FIG. 11A to FIG. 11E are conceptual views of full feature and semi feature.

FIGS. 11A to 11E are conceptual views of the full feature and the half feature. In FIG. 11A, a first object 23 having two corners and a linear-shaped second object 24 appear on the image 22. As already described, the full feature point refers to an evaluation point whose pixel value changes significantly along any line through the point, and the semi feature point refers to an evaluation point whose pixel value hardly changes along one line through the point but changes significantly along other lines through the point. In this image 22, therefore, the two corners of the first object 23 are the full feature points (in a black circle) 25, and any point on the linear portion of each edge of the first object 23 and any point on the linear portion of the second object 24 are semi feature points (in a white circle) 26.

Figure 11B:
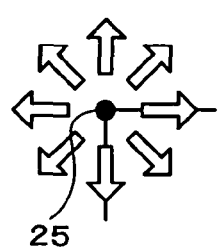
Figure 11C:
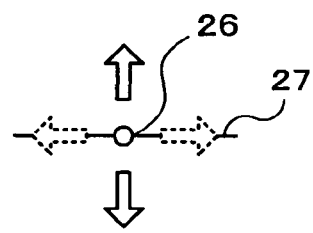
Figure 11D:
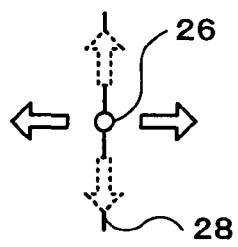
Figure 11E:
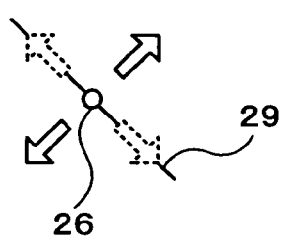

In other words, as shown in FIG. 11B, the full feature point 25 refers to a point whose pixel value changes significantly along any line through the point. (In this diagram, as a representative example, directions at intervals of 45 degrees are shown as white outlined arrows.) As shown in FIGS. 11C to 11E, the semi feature point 26 refers to a point whose pixel value hardly changes along one line through the point (i.e., the directions along the lines 27 to 29), but changes significantly along other lines through the point (i.e., directions perpendicular to the lines 27 to 29).

In addition, for example, the components of the featureless direction of the motion vector may be ignored (or made unknown, indeterminate or free) based on the tracking result of the semi feature points and only the components in the feature direction may be configured to be effective. By doing this, the motion of the evaluation point in the featureless direction can be excluded, and errors can be eliminated when the semi feature point is detected employing a conventional algorithm.

Figure 12:
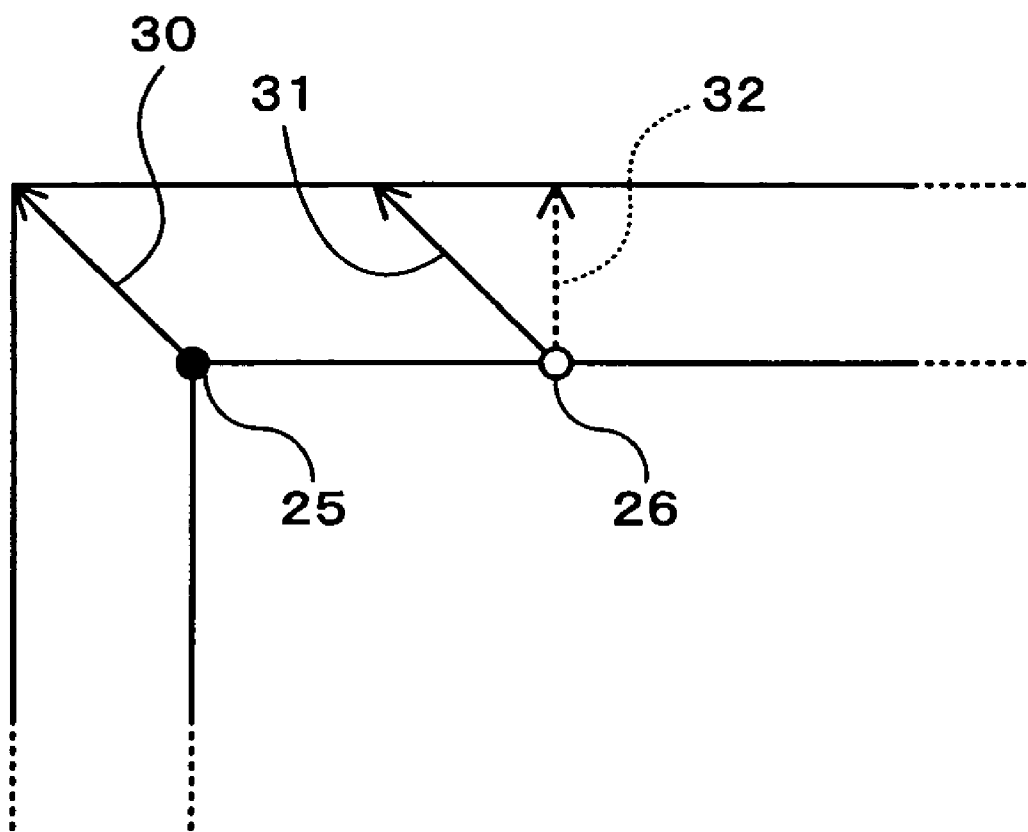
FIG. 12 is a conceptual view of semi feature with components in the featureless direction being ignored.

FIG. 12 is a conceptual view of the semi feature ignoring the composition of the featureless direction. In this diagram, arrows in the solid line 30, 31 are the motion vectors of the tracking result of the full feature point 25 and the semi feature point 26, respectively. A tracking algorithm of the full feature point 25 may be the same as that of a conventional one. For the semi feature point 26, however, the tracking result is a vector 32 which is determined by projecting the corresponding motion vector 31 in the featureless direction.

In addition, when the semi feature points are to be tracked, they may be searched with the motion in the featureless direction being set as a constant (e.g., 0) and constraint being imposed only to the feature direction. Search of the evaluation points only in the feature direction enables stabilizing the search, converging the search quickly, and reducing erroneous tracking caused by amplified misalignment which occurs every time processing is repeated.

Figure 13A:
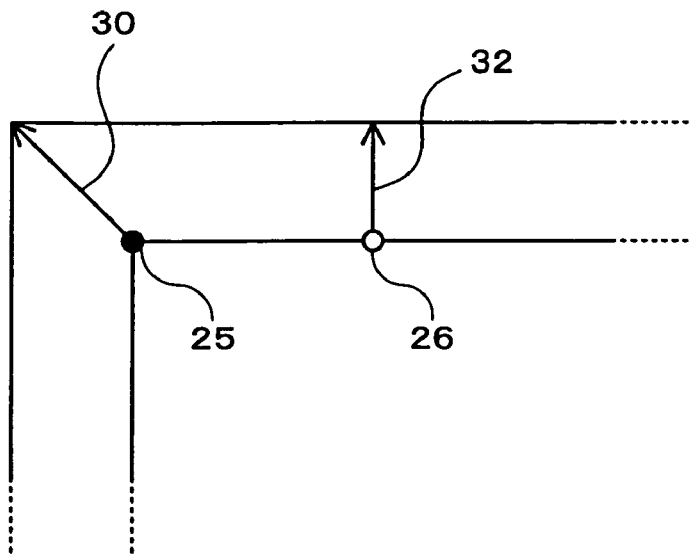
FIG. 13A and FIG. 13B are conceptual views of the semi feature for which a motion in a featureless direction is constrained to a feature direction only and a diagram showing a tracking result, respectively.

FIG. 13A is a conceptual view of the semi feature in which the motion in the featureless direction is constrained only to the motion in the feature direction. In this diagram, arrows in the solid line 30, 33 are the motion vectors of the tracking result of the full feature point 25 and the semi feature point 26, respectively. For the motion vector 33 for the semi feature point 26, solution is to be found in the feature direction only from the beginning. In other words, the motion vector 32 shown in FIG. 12 and the motion vector shown in FIG. 13 are substantially identical.

Figure 13B:
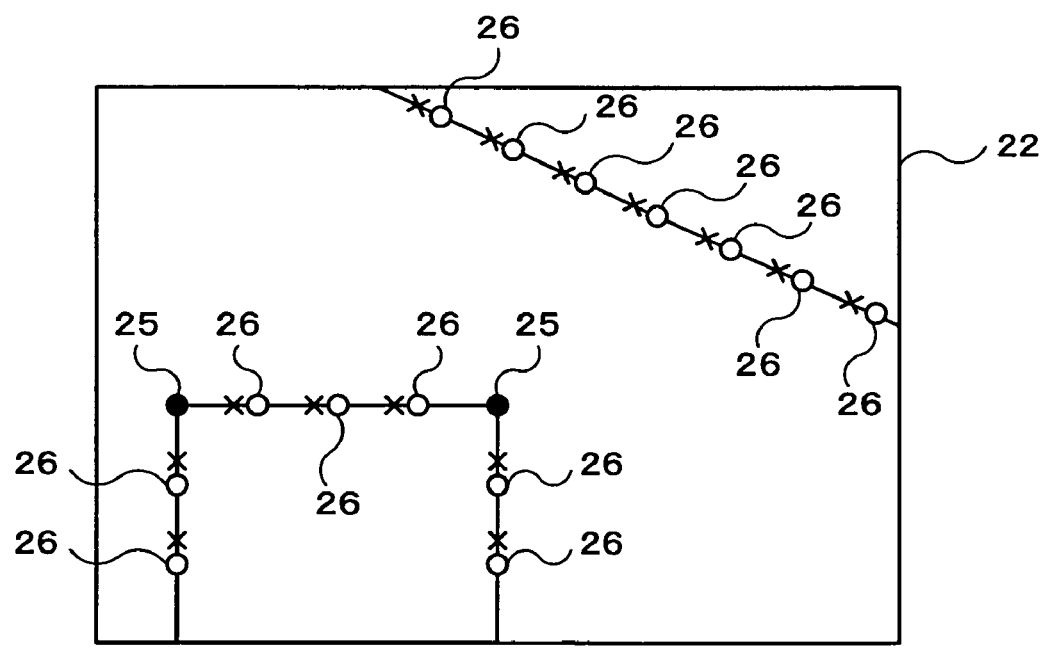
Figure 19A:
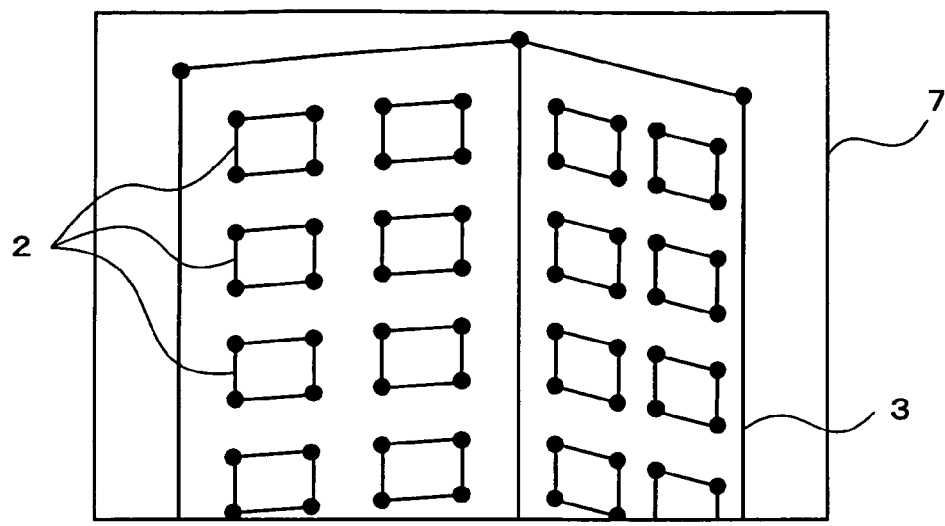
FIG. 19A and FIG. 19B are diagrams showing feature points of a first composition 7 and a second composition 8, respectively.
Figure 19B:
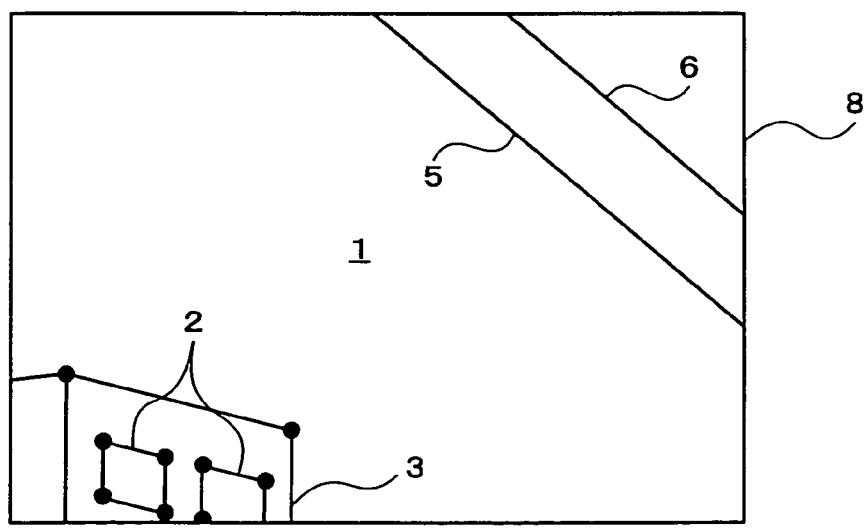

FIG. 13B is a diagram showing the tracking result, indicating a synthesized image 16 generated by overlapping the two images (the reference image 10 and the image to be tracked 11) corresponding to the motion. Symbols X in the diagram indicates the tracking result. As also apparent from this diagram, even in the case where the non-presence area (non-detection area) of the full feature points exists in a part of the image, the non-presence area can be supplemented by the semi feature points. Accordingly, it is possible to cover the feature points (i.e., the full feature points 25 and the semi feature points 26) for the whole image. As a result, misalignment of the image can be accurately corrected by utilizing the semi feature points on the object (i.e., the wire cables, 5, 6 in this embodiment), even in the feature point non-presence section (i.e., a portion where the wire cables 5, 6 appear) in FIG. 19B for which precise alignment was difficult with the conventional prior art.

With regard to the semi feature points, a magnitude of the gradient (or a magnitude of the rate of change) in the direction where a pixel value changes most when the pixel is moved in a certain direction may be used as an evaluated value for ranking the semi feature points. In other words, an evaluation point at which a clear difference appears at least in one direction may be selected as the semi feature point. By doing this, it is easier to find a motion in a unidirectional motion and a point providing clear difference can be selected as the semi feature point.

In addition, when the semi feature points are to be selected, a pixel with a small ratio of the magnitude of the gradient (or the magnitude of the rate of change) in the direction where a pixel value changes most when the pixel is moved in a certain direction to the magnitude of the gradient (or the magnitude of the rate of change) in the direction where a pixel value changes least may be excluded from the semi feature candidates. Alternatively, the evaluated value of the pixel may be reduced. By doing this, it is possible to prevent erroneous inclusion to the semi feature of an evaluation point which does not exist on the unidirectional edge (for example, a point on a flat portion where a lot of noise is generated).

In addition, using the matrix G to be used for tracking in a known gradient method, the magnitude of the gradient in the direction where a pixel value changes most when the pixel is moved in a certain direction may be set as the maximum eigenvalue of G, and the magnitude of the gradient in the direction where a pixel value changes least when the pixel is moved in a certain direction may be set as the minimum eigenvalue of G. By doing this, since the semi feature point can be detected from the matrix G to be used for tracking, the amount of calculation can be saved. Also, since the feature points are ranked using the evaluated values based on this, stabilized tracking is ensured.

In addition, as a method to evaluate the magnitude of the gradient for the semi feature points, (an approximate value of) the maximum curvature may be used. By doing this, since the features are ranked using the evaluated values based on this, stability of tracking is ensured.

In addition, when the semi feature points are to be selected, the minimum distance to another feature point (i.e., a full feature point or a semi feature point) may be set larger than the minimum distance between the full feature points. By doing this, it is possible to prevent increase in meaningless features as the constraint.

In addition, the previous equation Formula 32 may be applied for the semi feature point. By doing this, since it is possible to track the semi feature points based on a coefficient of the same matrix G as those that are used for the feature point extraction and the full feature point tracking, the amount of calculation can be saved.

Although the gradient method is used for detecting the feature points in the foregoing description, the method is not limited to this, and other methods such as block matching may be used. Alternatively, in stead of selecting or ranking the feature points, the feature points may only have to be classified into the full feature points and the semi feature points.

A coordinate transformation for alignment which is used in the corresponding position calculation section 15b (see FIG.

2) includes models of projective transformation (homography) (hereinafter referred to as homography) (8 degrees of freedom), affine transformation (6 degrees of freedom), Euclidean similarity transformation (3 degrees of freedom), rigid transformation (3 degrees of freedom), pure translation (2 degrees of freedom) and the like. While transformation with a small degree of freedom has a smaller application area, it also has advantages such as reduced calculation load, reduced instability caused by errors and the like. Therefore, appropriate transformation is selected conveniently.

Generally, a coordinate transformation equation may be determined either in the positive direction (from the reference image 10 to the image to be tracked 11) or in the reverse direction (from the image to be tracked 11 to the reference image 10). (The reverse transformation can be easily determined from one transformation.) In this embodiment, the feature direction was determined in the coordinate system of the reference image 10. Therefore, to be exact, it is correct that the processing hereafter is applied to find the transformation in the reverse direction (i.e., from the image to be tracked 11 to the reference image 10), that is, it is applied to the coordinate system of the reference image 10. However, even in the case where the transformation in the positive direction (from the reference image 10 to the image to be tracked 11) is to be determined, it is also possible to apply the processing to be described hereafter as it is in many cases. This is because transformation will be the same for a model that does not contain rotational components such as the pure translation model, and even for other models that contain rotational components (if the rotation is assumed to be small) each equation approximately holds true. Accordingly, description shall be generalized hereafter such that one of the reference image 10 and the image to be tracked 11 shall be referred to as a first image $I_1$ and the other shall be referred to as a second image $I_2$.

In the present embodiment, coefficients (i.e., parameters) of the coordinate transformation equation are determined based on RANSAC (i.e., RANdom SAmple Consensus). The RANSAC is one of the methods for estimating the parameters. This method determines candidates for estimated parameters out of a small number of the points, applies the determined estimation candidates to a number of the points, determines the number of points that match the estimation and the degree of the matching accuracy, i.e., calculates the number of support, and adopts the estimation candidates having a large number of support as the final estimation result.

Figure 14:
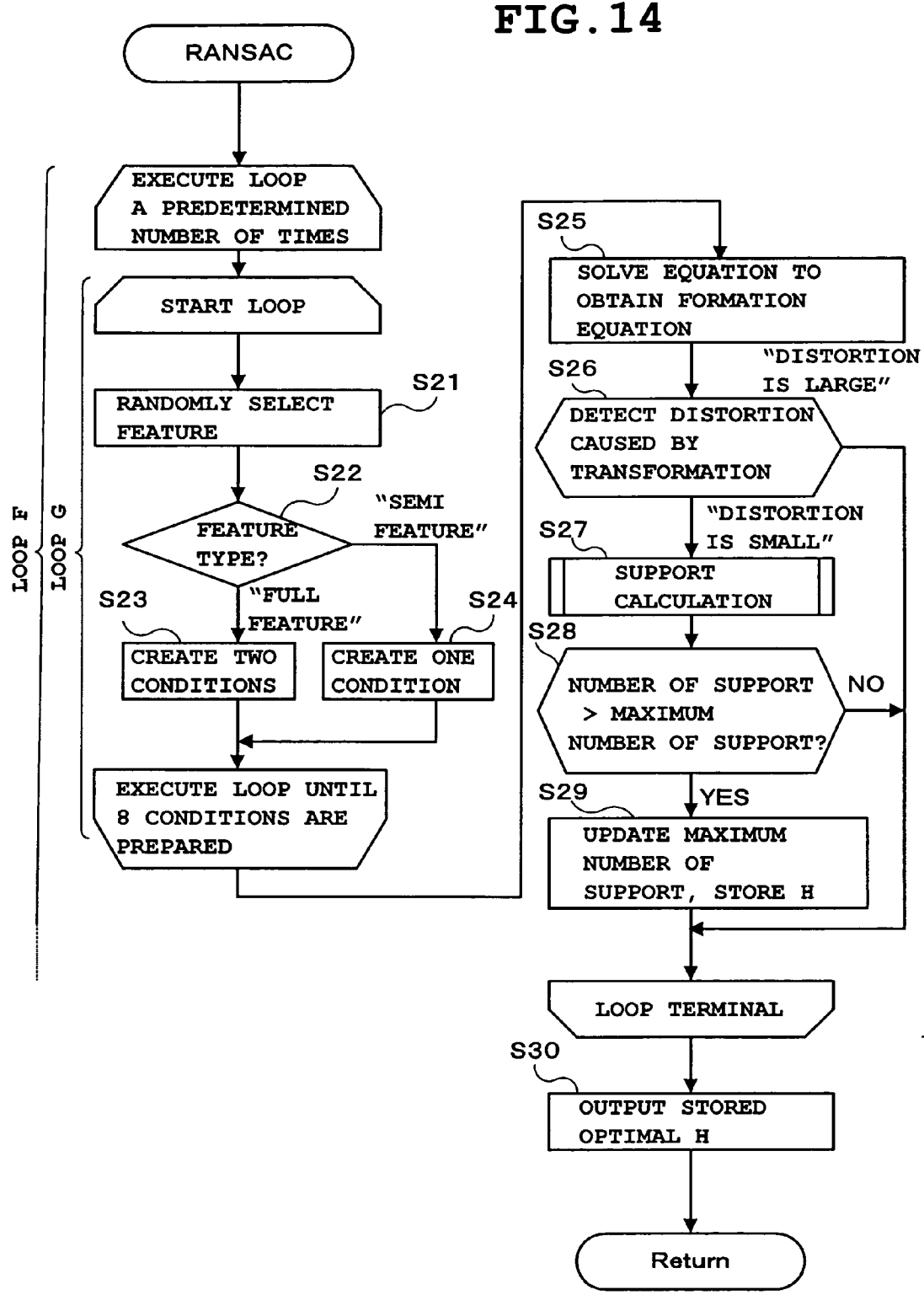
FIG. 14 is an operational flowchart of a RANSAC section 14.

FIG. 14 is a diagram showing an operational flowchart of the RANSAC section 14. This flow comprises a first loop (hereinafter referred to as the loop F) and a second loop which nest in the loop F (hereinafter, loop G).

Once the flow is started, first, the loop F is executed a predetermined number of times. In the loop F, first, the nested loop G is executed. In the loop G, the feature points are randomly selected (Step S21), and the type of the feature is determined (Step S22). Next, if the feature point that has been randomly selected is the "full feature point," two conditions are created (see Formulas 37 and 38 to be described later) (Step S23). If the feature point is the "semi feature point," one condition is created (see Formula 39 to be described later.) (Step S24). Next, the loop G is repeated until all eight conditions are prepared. After the eight conditions are prepared, the equation is solved to find the transformation equation (i.e., the homography matrix H) (Step S25). Next, the magnitude of deformation of the homography (i.e., deformation of H) is detected (Step S26), and a "support calculation" to be described later will be executed only if the deformation is small (Step S37). At the same time, it is determined whether the number of support exceeds a current maximum number of support (Step S28), and if it exceeds the maximum number, the maximum number of support is updated and H is saved (Step S29). When the loop terminal is reached, the optimal H that has been saved is output (Step S30), and the flow is terminated.

Now, the full feature points and the semi feature points are extracted and tracked by the detection section 13, and the unit vector $u=(u_x, u_y)^T$ indicating the feature direction of each semi feature point is found as, for example, a unit vector $(u_x^2+u_y^2=1)$ corresponding to the maximum eigenvalue of the matrix G.

Now, the equation to find the homography matrix H when the homography model is employed is placed with each element satisfying $H=(h_{ij})$ aligned as the column vector as follows:

$$\tilde{h}=(h_{11}h_{12}h_{13}h_{21}h_{22}h_{23}h_{31}h_{32})^T \quad \text{Formula 36}$$

In the case where the feature point tracking processing has caused the coordinate (x, y) of the first image $I_1$ to correspond to the coordinate (X, Y) of the second image $I_2$, the two linear conditions as shown in the following equations Formulas 37 and 38 are created for each full feature point:

$$(fx\,fy\,f^2\,0\,0\,0-Xx-Xy)\tilde{h}=fX \quad \text{Formula 37}$$

and $$(0\,0\,0\,fx\,fy\,f^2-Yx-Yy)\tilde{h}=fY \quad \text{Formula 38}$$

Also, one linear condition as shown in the following equation Formula 39 is created for each semi feature point:

$$(fu_xx\,fu_xy\,f^2u_x\,fu_yx\,fu_yy\,f^2u_y-(Xu_x+Yu_y)x-(Xu_x+Yu_y)y)\tilde{h}=f(Xu_x+Yu_y) \quad \text{Formula 39}$$

When the eight conditions have been prepared, the equation is solved by the Gaussian elimination method to find the homography matrix H. Alternatively, the least squares solution may be found from 8 or more equations. In other words, the component of H is determined by solving the following equation Formula 40 in which eight or more conditions are aligned in the row vector as follows:

$$A\tilde{h}=b \quad \text{Formula 40}$$

[A is the coefficient matrix of the left member, and b is a constant term of the right member.]

By doing this, it is possible to specifically determine the homography matrix.

In the present embodiment, distortion of homography (distortion of H) is detected, for example, as follows: when 4 coordinates on the border of the image is shifted with $F_H$, the ratio of sides and the degree of divergence from 90° (i.e., distortion) of the pre- and post-transformed rectangles are examined. When the post-transformed rectangle remarkably differs from the original rectangle, the support calculation (Step S27) is omitted and then process is immediately moved to processing for the next candidate.

As described above, before the support calculation, there is inserted processing of detecting distortion of the determined transformation (i.e., detecting as to if deformation of the length or angle is within a certain limit) for the calculated homography matrix H containing the semi feature point, so as to exclude abnormal homography H. This is because H determined from a plurality of semi feature points that exist on the same straight line or parallel straight lines is ill-conditioned (i.e., almost linear dependent), and this ill condition is more likely to occur than an ill condition which is determined from the full feature points only (where the three or more points are aligned on the same straight line).

Regarding the coordinate transformation equations other than homography, two models (i.e., pure translation model and Euclidean similarity transformation model) will now be illustrated.

First, the pure translation model is a coordinate transformation as shown in the following equation Formula 41:

$$\begin{pmatrix} X \\ Y \end{pmatrix} = \begin{pmatrix} x \\ y \end{pmatrix} + \begin{pmatrix} a \\ b \end{pmatrix} \qquad \text{Formula 41}$$

When the following equation Formula 42 is placed:

vector $\tilde{h} = (ab)^T$      Formula 42 two linear conditions (i.e., equations) as shown in the following equation Formula 43 is determined for each full feature point:

$(f0)\tilde{h} = X - x$ $(0f)\tilde{h} = Y - y$      Formula 43 and one linear condition (i.e., equation) as shown in the following equation Formula 44 is determined for each semi feature point:

$(fu_x fu_y)\tilde{h} = (X-x)u_x + (Y-y)u_y$      Formula 44

Since the degree of freedom of this transformation is 2, the equations can be solved by preparing two or more conditions.

In addition, the Euclidean similarity model is a coordinate transformation as shown in the following equation Formula 45:

$$\begin{pmatrix} X \\ Y \end{pmatrix} = \begin{pmatrix} c & -d \\ d & c \end{pmatrix} \begin{pmatrix} x \\ y \end{pmatrix} + \begin{pmatrix} a \\ b \end{pmatrix} \qquad \text{Formula 45}$$

When the following equation Formula 46 is placed:

vector $\tilde{h} = (abcd)^T$      Formula 46 two linear conditions (i.e., equations) as shown in the following equation Formula 47 is determined for each full feature point:

$(f0x-y)\tilde{h} = X$ $(0fyx)\tilde{h} = Y$      Formula 47 and one linear condition (i.e., equation) as shown in the following equation Formula 48 is determined for each semi feature point:

$(fu_x fu_y xu_x + yu_y xu_y - yu_x)\tilde{h} = Xu_x + Yu_y$      Formula 48

Since the degree of freedom of this transformation is 4, the equations can be solved by preparing four or more conditions.

Figure 15:
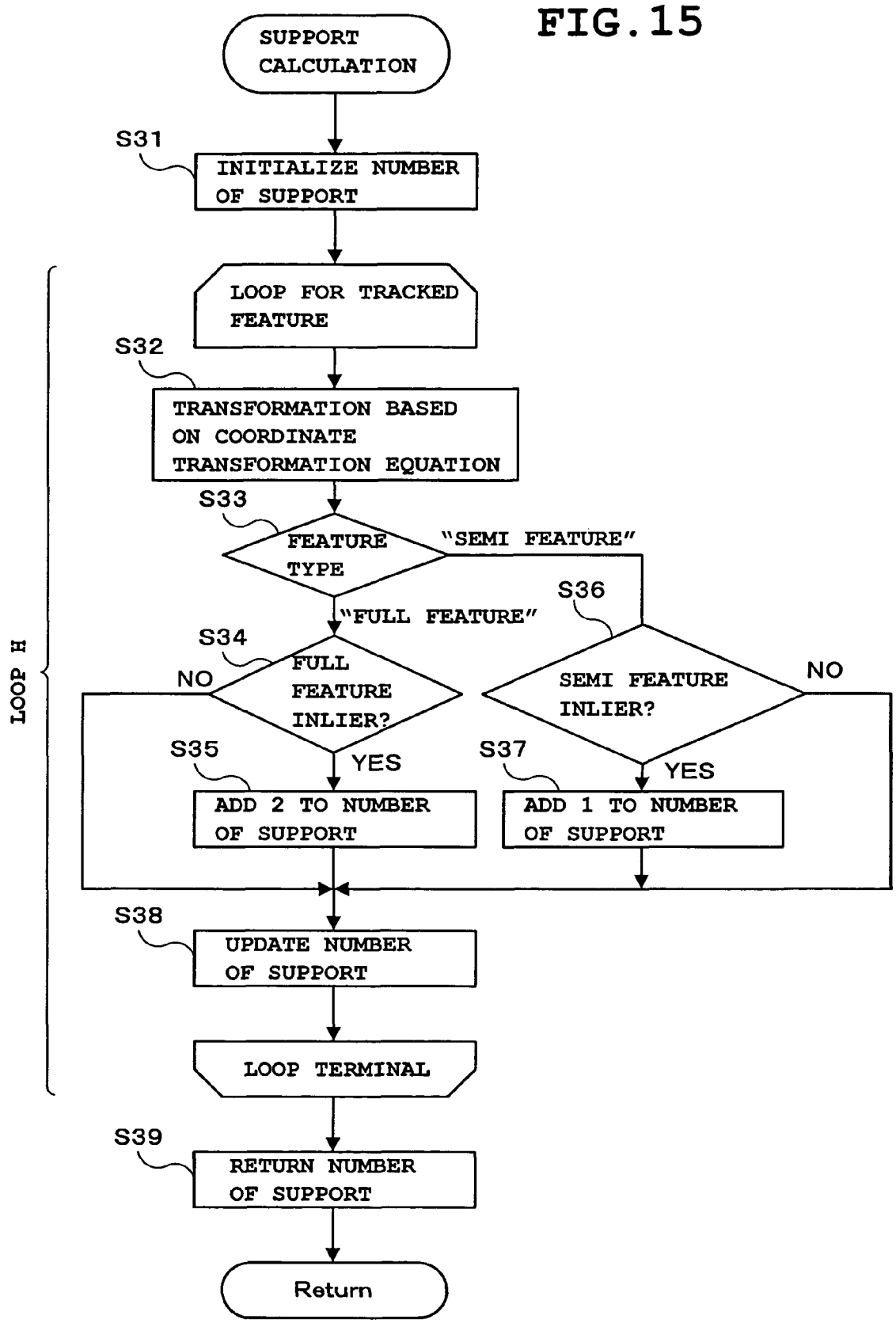
FIG. 15 is an operational flowchart of a support calculation.

FIG. 15 is a diagram showing an operational flowchart of the support calculation. In this flow, after the number of support is initialized (Step S31), a loop (hereinafter referred to as a loop H) is executed for the feature point which has been tracked. In the loop H, transformation based on the coordinate transformation equation is executed (Step S32) and the type of the feature is determined (Step S33). Next, if the feature type is the "full feature," an inlier determination for the full feature is executed (Step S34), and if the point is the all feature inlier, weight "2" is added to the number of support (Step S35). On the other hand, if the feature type is the "semi feature", an inlier determination for the semi feature is executed (Step S36), and if the point is the semi feature inlier, weight "1," which is smaller than that for the full feature inlier, is added to the number of support (Step S37). Next, the number of support is updated (Step S38), and when the loop terminal is reached, the number of support is returned (Step S39) and the flow is terminated.

As described above, in the present embodiment, when the coordinate transformation equation is calculated, a one-dimensional constraint created by projecting each vector in the feature direction (see previous equations Formulas 37 to 39) is set as a constraint for comparing the tracked motion vector with an offset vector created by the coordinate transformation which has been determined. By doing this, even if there are not full feature points, the coordinate transformation can be stably solved as long as semi feature points exist in various feature directions.

According to the present embodiment, RANSAC is used as a method to evaluate and confirm the correctness of the coordinate transformation. However, the method is not limited to this. Any method may be used as long as the comparison of the tracked motion vector with the offset vector created by the coordinate transformation which has been determined is a one-dimensional comparison where each vector is projected in the feature direction. Either of these methods can eliminate errors in the featureless direction when the coordinate transformation equation is evaluated and confirmed using the semi feature points.

Figure 16:
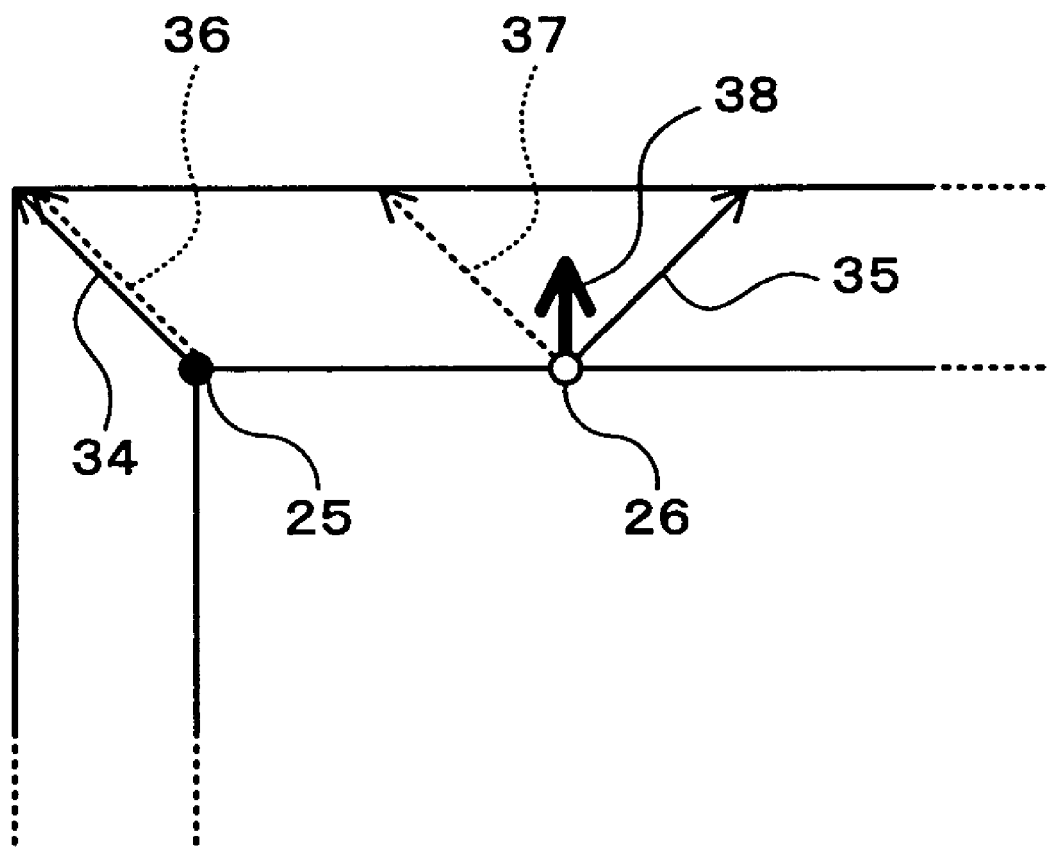
FIG. 16 is a conceptual view of a matching determination of the full feature and the semi feature.

FIG. 16 is a conceptual view of a matching determination of the full feature points and the semi feature points. In this diagram, when the full feature point 25 exists on a corner and the semi feature point 26 exists on an edge, motion vectors 34, 35 that have been determined by tracking are indicated in solid lines, and offset vectors 36, 37 based on a candidate coordinate transformation are indicated in dotted lines. A bold arrow attached to the semi feature point 26 is a unit vector 38 in the feature direction. For the full feature point 25, what is necessary is only to determine whether or not the destination coordinates determined by being moved by the two vectors 34, 36 are within a certain distance. On the other hand, for the semi feature 26, although both the direction and size of the two vectors 35, 37 differ from each other in this case, they are substantially identical when they are projected in the feature direction (that is, when the inner product with the unit vector 38 in the feature direction is calculated). Therefore, it is determined that tracking of the semi feature 26 matches the coordinate transformation.

Comparison of vectors requires a smaller amount of calculation than the comparison of the pixel values in the window. Therefore, when the semi feature point is used for RANSEC, a point may be determined as an inlier, if the tracked motion vector and the offset vector toward the destination coordinate determined by being moved by a candidate coordinate transformation equation are projected in the feature direction for comparison and the two vectors are substantially identical as a result of comparison. By doing this, it is possible to increase the number of loop of RANSEC, thereby enabling search of a better transformation equation.

As an alternative method that does not use projection in the feature direction, it is possible to perform a matching determination by comparing the pixel values. When the semi feature point is used for RANSEC, a point may be determined as an inlier, if the pixel values in the window around the semi feature points are compared between the first image $I_1$ and the second image $I_2$, and difference therebetween is small. (The sum of difference absolute value, the difference square sum or the like may be calculated as the degree of difference.) By doing this, a conspicuous double-looking image can be excluded thanks to comparison based on pixel values.

In addition, in the support calculation of RANSAC, as the number of support, a weight value such as $2N_f+N_s$, which is stronger (i.e., larger) than the number of semi feature inlier point $N_s$, may be used for the number of full feature inlier point $N_f$. By doing this, it is possible to perform appropriate weighing corresponding to the difference in the information amount between the full feature and the semi feature, thereby enhancing matching to the full feature. In addition, while the full feature has two-dimensional information, the semi feature has only one-dimensional information. Therefore, if the number of full features and the number of semi features are almost equal, it is possible to place priority on the full feature having a higher accuracy, thereby enabling selection of a more stable transformation equation.

Figure 17:
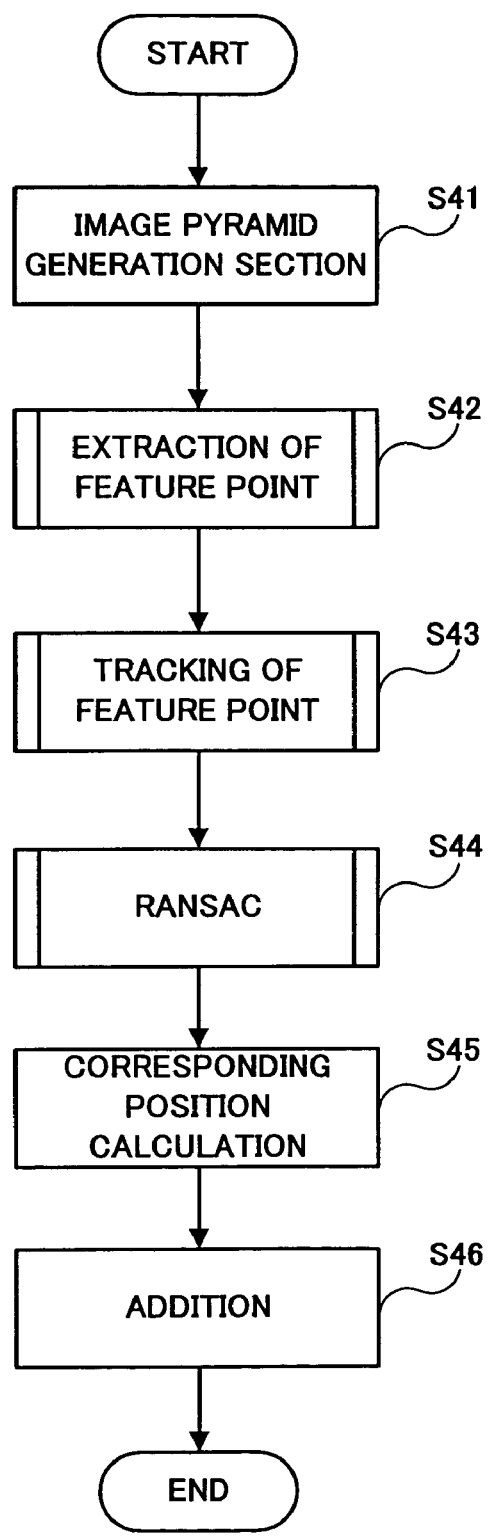
FIG. 17 is a drawing showing an operational flowchart of the combined program.
Figure 18:
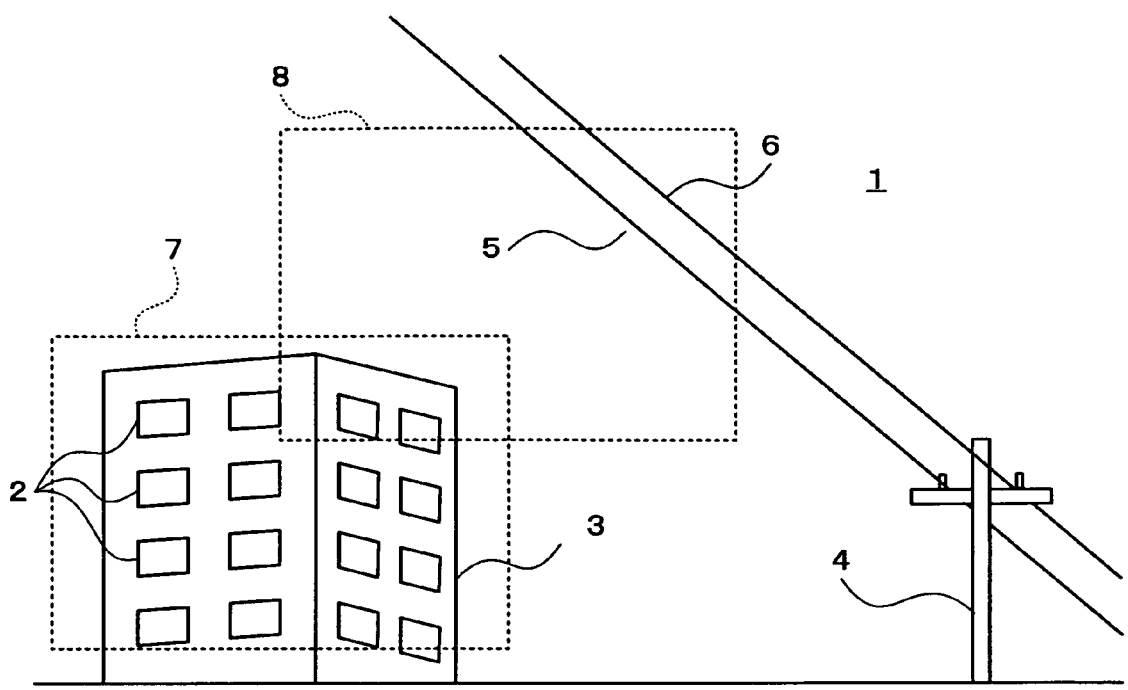
FIG. 18 is one example of an object for explaining inconvenience of a conventional prior art.

The present invention can also be implemented as a combined program of flows explained above, for running on a CPU. FIG. 17 is a drawing showing an operational flowchart of the combined program. In this flow, after the image pyramid generation section is initialized (Step S41), extraction of feature point (Step S42), tracking of feature point (Step S43), RANSAC (Step S44), corresponding position calculation (Step S45) and addition (Step S46) are performed and the flow terminated.

The present invention can also be applied to a panorama synthesis for synthesizing a one-sheet image covering a large area by connecting several images that are partially overlapped with each other. After detecting the overlapping area of the two images by block matching or the like, the coordinate transformation can be determined by extracting and tracking the feature points within the overlapping range using the method according to the present invention. Note that in the synthesis processing, it is preferable that blending processing or the like be executed so as to make the border less conspicuous, rather than using a mere average of the pixel values.

In addition, the present invention can be applied to correction of the camera shake in movie shooting (i.e., electronic correction of the camera shake). That is, when movie is shot and replayed, a motion vector of the whole image caused by camera shake is calculated, and each frame or field is translated so as to cancel the motion vector. By doing this, camera shake is reduced and stable movie can be generated. More specifically, a motion vector dominating the image is determined by using coordinate transformation such as pure translation model, after extracting and tracking the feature points in accordance with the method of the present invention. In stead of synthesizing images by addition, a new frame or field may be sequentially replaced by an image which is created by translation by the thus-determined motion vector. By doing this, a movie with a reduced camera shake can be generated.

Furthermore, although the computer program product of the image processing apparatus which is a preferred embodiment of the present invention is stored in the memory (for example, ROM, etc.) of the image processing apparatus, this processing program is stored on a computer-readable medium and should also be protected in the case of manufacturing, selling, etc. of only the program. In that case, the method of protecting the program with a patent will be realized by the form of the computer-readable medium on which the computer program product is stored.

While the present invention has been described with reference to the preferred embodiments, it is intended that the invention be not limited by any of the details of the description therein but includes all the embodiments which fall within the scope of the appended claims.

What is claimed is:

1. An image processing apparatus, comprising:
   a calculating section which calculates a gradient covariance matrix for each of a plurality of points in an image based on neighboring pixel values around the point, and which calculates multiple eigenvalues for each of the gradient covariance matrices;
   a full feature point detection section for detecting, and identifying as a full feature point, a point whose gradient covariance matrix has a minimum eigenvalue that is more than a certain amount;
   a semi feature point detection section for detecting, and identifying as a semi feature point, a point whose gradient covariance matrix has a largest maximum eigenvalue among points whose gradient covariance matrices have a ratio of a maximum eigenvalue to a minimum eigenvalue that is more than a predetermined amount;
   a first tracking section for tracking the identified full feature point between a first image and a second image;
   a second tracking section for tracking the identified semi feature point; and
   an alignment section for aligning the first and second images based on a tracking result of the first tracking section and the second tracking section.

2. The image processing apparatus according to claim 1, wherein the alignment section comprises an evaluation section for evaluating correctness of a calculated coordinate transform equation based on the tracking result of the first tracking section and the second tracking section, and the alignment section chooses the coordinate transform equation based on a judgment made by the evaluation section.

3. The image processing apparatus according to claim 2, wherein the evaluation section weights an evaluation related to the full feature point more than an evaluation related to the semi feature point.

4. The image processing apparatus according to claim 1, further comprising:
   an addition section for synthesizing one image from a plurality of images which have been subjected to alignment by the alignment section.

5. The image processing apparatus according to claim 4, wherein the alignment section comprises an evaluation section for evaluating correctness of a calculated coordinate transform equation based on the tracking result of the first tracking section and the second tracking section, and the alignment section chooses the coordinate transform equation based on a judgment made by the evaluation section.

6. The image processing apparatus according to claim 5, wherein the evaluation section weights an evaluation related to the full feature point more than an evaluation related to the semi feature point.

7. An image processing method, comprising:
   a calculating step for calculating a gradient covariance matrix for each of a plurality of points in an image based on neighboring pixel values around the point, and for calculating multiple eigenvalues for each of the gradient covariance matrices;
   a full feature point detection step for detecting, and identifying as a full feature point, a point whose gradient covariance matrix has a minimum eigenvalue that is more than a certain amount;
   a semi feature point detection step for detecting, and identifying as a semi feature point, a point whose gradient covariance matrix has a largest maximum eigenvalue among points whose gradient covariance matrices have a ratio of a maximum eigenvalue to a minimum eigenvalue that is more than a predetermined amount;

a first tracking step for tracking the identified full feature point between a first image and a second image;

a second tracking step for tracking the identified semi feature point; and an alignment step for aligning the first and second images based on a tracking result of the first tracking step and the second tracking step.

8. The image processing method according to claim 7, wherein the alignment step comprises an evaluation step for evaluating correctness of a calculated coordinate transform equation based on the tracking result of the first tracking step and the second tracking step, and the alignment step comprises choosing the coordinate transform equation based on a judgment made by the evaluation step.

9. The image processing method according to claim 8, wherein the evaluation step weights an evaluation related to the full feature point more than an evaluation related to the semi feature point.

10. The image processing method according to claim 7, further comprising:

an addition step for synthesizing one image from a plurality of images which have been subjected to alignment by the alignment step.

11. The image processing method according to claim 10, wherein the alignment step comprises an evaluation step for evaluating correctness of a calculated coordinate transform equation based on the tracking result of the first tracking steep and the second tracking step, and the alignment step comprises choosing the coordinate transform equation based on a judgment made by the evaluation step.

12. The image processing method according to claim 11, wherein the evaluation step weights an evaluation related to the full feature point more than an evaluation related to the semi feature point.

13. A non-transitory computer-readable medium having an image processing program stored thereon that is executable by a computer to perform a process comprising:

a calculating step for calculating a gradient covariance matrix for each of a plurality of points in an image based on neighboring pixel values around the point, and for calculating multiple eigenvalues for each of the gradient covariance matrices;

a full feature point detection step for detecting, and identifying as a full feature point, a point whose gradient covariance matrix has a minimum eigenvalue that is more than a certain amount;

a semi feature point detection step for detecting, and identifying as a semi feature point, a point whose gradient covariance matrix has a largest maximum eigenvalue among points whose gradient covariance matrices have a ratio of a maximum eigenvalue to a minimum eigenvalue that is more than a predetermined amount;

a first tracking step for tracking the identified full feature point between a first image and a second image;

a second tracking step for tracking the identified semi feature point; and an alignment step for aligning the first and second images based on a tracking result of the first tracking step and the second tracking step.

14. The computer-readable medium according to claim 13, wherein the alignment step comprises an evaluation step for evaluating correctness of a calculated coordinate transform equation based on the tracking result of the first tracking step and the second tracking step, and the alignment step comprises choosing the coordinate transform equation based on a judgment made by the evaluation step.

15. The computer-readable medium according to claim 14, wherein the evaluation step weights an evaluation related to the full feature point more than an evaluation related to the semi feature point.

16. The computer-readable medium according to claim 13, further comprising:

an addition step for synthesizing one image from a plurality of images which have been subjected to alignment by the alignment step.

17. The computer-readable medium according to claim 16, wherein the alignment step comprises an evaluation step for evaluating correctness of a calculated coordinate transform equation based on the tracking result of the first tracking step and the second tracking step, and the alignment step comprises choosing the coordinate transform equation based on a judgment made by the evaluation step.

18. The computer-readable medium according to claim 17, wherein the evaluation step weights an evaluation related to the full feature point more than an evaluation related to the semi feature point.

* * * * *